United States Patent
Mushiake et al.

(10) Patent No.: US 6,669,986 B1
(45) Date of Patent: Dec. 30, 2003

(54) PROCESS FOR MANUFACTURING MULTILAYER PELLETS AND USE OF THE MULTILAYER PELLETS

(75) Inventors: Naohiko Mushiake, Itami (JP); Kenji Kodama, Itami (JP); Hiroyuki Mori, Itami (JP); Sumio Hamada, Itami (JP); Tuyoshi Itou, Itami (JP); Jun Komai, Ibaraki (JP)

(73) Assignee: Sumika Color Company, Limited, Osaka (JP)

( * ) Notice: Subject to any disclaimer, the term of this patent is extended or adjusted under 35 U.S.C. 154(b) by 0 days.

(21) Appl. No.: 09/517,095

(22) Filed: Mar. 1, 2000

(30) Foreign Application Priority Data

Jun. 25, 1999 (JP) .......................................... 11-180924
Oct. 8, 1999 (JP) .......................................... 11-288475

(51) Int. Cl.⁷ .............................. B32B 5/16; B29C 47/00
(52) U.S. Cl. .................. 427/214; 264/143; 264/173.16; 425/97; 425/114; 425/133.1; 425/464; 425/468; 428/403; 428/407
(58) Field of Search .................... 428/403, 407; 427/212, 214; 264/143, 173.16; 425/97, 106, 114, 133.1, 464, 468

(56) References Cited

U.S. PATENT DOCUMENTS

| | | |
|---|---|---|
| 3,608,033 A | 9/1971 | Hall |
| 3,669,591 A | 6/1972 | Fermi et al. |
| 4,195,114 A | 3/1980 | Crosby et al. |
| 4,791,965 A * | 12/1988 | Wynn ........................... 138/146 |
| 4,900,572 A * | 2/1990 | Repholz et al. ............. 426/282 |
| 4,960,642 A | 10/1990 | Kosuga et al. |
| 5,221,580 A | 6/1993 | Amory et al. |
| 5,627,218 A * | 5/1997 | Bradt ........................... 521/57 |
| 5,747,548 A * | 5/1998 | Bradt ........................... 521/57 |
| 5,906,838 A | 5/1999 | Keehn et al. |
| 6,120,802 A * | 9/2000 | Breitenbach et al. ........ 424/464 |
| 6,238,606 B1 * | 5/2001 | Kunieda et al. ............. 264/143 |
| 6,280,672 B2 * | 8/2001 | Keehn et al. ........... 264/193.16 |

FOREIGN PATENT DOCUMENTS

| | | |
|---|---|---|
| EP | 0 091 235 A2 | 10/1983 |
| JP | 49-090364 | 8/1974 |
| JP | 55-166216 | 12/1980 |
| JP | 59-081120 | 5/1984 |
| JP | 59-081121 | 5/1984 |
| JP | 5-078579 | 10/1993 |
| JP | 07-171828 | 7/1995 |
| JP | 7-171828 | 7/1995 |
| JP | 09-164526 | 6/1997 |
| JP | 10-060103 | 3/1998 |
| WO | 95/12631 | 5/1995 |

* cited by examiner

*Primary Examiner*—H. Thi Le
(74) *Attorney, Agent, or Firm*—Birch, Stewart, Kolasch & Birch, LLP

(57) ABSTRACT

A process for manufacturing multilayer pellets having a core-sheath structure with a molding material forming a sheath which covers the outer circumference of another molding material forming a core, which includes (a) supplying the core material and the sheath material to a die extruder having multiple extrusion-forming parts arranged along a circumference, (b) extruding multiple multilayer strands from the extrusion-forming parts by covering around the outer circumference of the core material concentrically with the sheath material, and (c) cutting the extruded multilayer strands to manufacture multilayer pellets.

10 Claims, 6 Drawing Sheets

PROCESS FOR MANUFACTURING MULTILAYER PELLETS AND USE OF THE MULTILAYER PELLETS

BACKGROUND OF THE INVENTION

The present invention relates to a process for manufacturing multilayer pellets and a die equipment for manufacturing multilayer pellets. In more detail, the present invention relates to a process for manufacturing multilayer pellets served as a molding material for various plastic products and having a core-sheath structure comprising a plurality of molding materials and a die equipment used for manufacturing multilayer pellets with the extrusion molding technique.

The present invention also relates to masterbatch resin pellets with improved brittleness and a process for manufacturing thereof using a multilayer pellet.

The present invention further relates to a process for drying and manufacturing thermoplastic polyester resin with good drying acceleration using a multilayer pellet.

Pellets for plastic molding are obtained by heating and melting plastic materials previously blended and extrusion-molding the melted materials into strand forms, and then cutting the obtained plastic strands into small tablet forms, so-called pellets.

When various plastic products are molded, preparing the pellets as described above has many advantages. For example, blending and adjusting materials are not required every time when plastic products are molded; stable operation of plastic molding can be performed; stabilized product quality can be obtained; and raw materials can be easily supplied to the molding machine and other handling becomes easier.

Plastic pellets entirely molded from one plastic material are common. However, double-layer pellets or multilayer pellets comprising a plurality of plastic materials and a process for manufacturing such pellets have also been proposed.

JP-A-7-171828 ("JP-A-" indicates Japanese Unexamined Patent Publication) discloses multilayer pellets of a core-sheath structure in which a material with rich adhesiveness is used as the core and a crystalline polyolefin resin with less adhesiveness is used as the sheath in order to solve the problem of likeliness to cause blocking of pellets manufactured from materials with rich adhesiveness.

JP-A-59-81121 discloses a process for manufacturing pellets from an olefin-vinyl alcohol copolymer which is unable to form strands for manufacturing pellets due to its too small melt tension. In the process, multilayer pellets of a core-sheath structure is manufactured by cutting multilayer strands having a core with resin having small melt tension, i.e, the olefin-vinyl alcohol copolymer, outer circumference of which is covered with resin having large melt tension. JP-A-59-81121 also shows a manufacturing equipment having a dice-head for pellet molding equipped with a structure for feeding sheath material to the circumference of core material.

PROBLEMS TO BE SOLVED BY THE INVENTION

With the conventional multilayer pellet manufacturing technique, the molding speed of multilayer strands must be set to a comparatively low level in order to successively cover the sheath material around the outer circumference of the core material when the multilayer strand is molded. Consequently, the productivity of the multilayer strand and multilayer pellets is poor and manufacturing cost of multilayer pellets is high.

In order to solve this problem, a method of using a strand molding machine equipped with a plurality of dice heads, that is, extrusion ports, and manufacturing a plurality of multilayer strands simultaneously could be proposed.

However, it is difficult to adjust in such a manner as to successfully cover the outer circumference of the core material with the sheath material of a specified thickness at each of a plurality of extrusion ports. It is also difficult to feed the molten resin materials to a plurality of extrusion ports in a uniform quantity and at uniform flow rate and to control uniformly the flow of core material and sheath material throughout the full circumference of the flow.

One object of the present invention is to solve the above-mentioned problem and to provide a process for manufacturing multilayer pellets of a high quality and having a stable core-sheath structure at a high productivity.

As mentioned above, the present invention also relates to masterbatch resin pellets with improved brittleness and a process for manufacturing thereof using a multilayer pellet.

As methods for blending pigments; low molecular weight polymer such as wax, additives such as plasticizer, antioxidant, ultraviolet absorbent, light stabilizer, etc. (hereinafter called the "pigments, etc.") in a thermoplastic resin such as polystyrene, polyester and polypropylene, a method for adding these pigments, etc. at the time of polymerization reaction; a method for adding masterbatch, in which pigments, etc. are dispersed in or stuck to a polymer at a high concentration, to natural resin; a method for adding, directly to polymer, the pigments, etc. or processed pigments or the like which comprises the pigments, etc. and dispersant such as low-molecular weight polyethylene or a metallic soap; and other methods are known. Of these, the method for adding masterbatch is most popularly used in various fields because of its handiness at the time of addition and excellent performance, for example, non-contamination, suitability to automatic weighing, and suitability to transportation.

The masterbatch comprises base resin as a main component, to which pigments, etc. are mixed, and in general, the masterbatch is used by diluting 2 to 150 times by a resin, so-called natural resin, at the time of its application. In general, for the base resin of the masterbatch, a resin identical to or similar to the natural resin is used because of the relation in properties to the natural resin or fluidity of the masterbatch. For the masterbatch manufacturing method, it is common practice to extrude the melt containing the base resin and pigments, etc. into a form of strand, and then, to cool the strand, and to cut it into pellets.

Since the masterbatch is diluted with natural resin at the time of application, it is desirable to contain pigments, etc. at a high concentration. However, manufacturing such a masterbatch containing a high concentration of pigments by a conventional method, strand breakage at the time of melting-extrusion and generation of chips at the time of cutting are caused due to the brittleness of the composition. In addition, since compatibility of the additives with the base resin is generally low, if a masterbatch containing a high concentration of additives is manufactured by a conventional method, the additives tend to be localized and the portions where the additives-localized becomes brittle, also causing problems of strand breakage at the time of melting-extrusion and generation of chips at the time of cutting.

Another object of the present invention is to provide a process for manufacturing master-batch resin pellets containing a high concentration of pigments, etc. free of strand breakage at the time of melting-extrusion and chip generation at the time of cutting. It is also an object of the present invention to provide masterbatch resin pellets obtained by the process.

The inventors have found that these objects of the present invention can be accomplished by using specific multilayer pellets manufactured by a process such as those mentioned above.

As mentioned above, the present invention further relates to a process for drying and manufacturing thermoplastic polyester resin with good drying acceleration using a multilayer pellet.

Thermoplastic polyester resin such as polyethylene terephthalate, etc. is composed with repetitive units having ester bonds. However, when it is heated in the presence of moisture, esteric bonds are hydrolyzed to change resin quality, and to cause problems of poor moldability, etc. Consequently, before molding, the moisture in the thermoplastic polyester resin must be removed, and from the industrial viewpoint, it is generally preferable to dry at sufficiently higher temperature than the glass transition point. If the resin is highly crystalline like polyethylene terephthalate or polybutylene terephthalate, no particular problem occurred even when drying was carried out at higher temperature than the glass transition point.

However, in recent years, cases, in which an amorphous copolyester resin or a polyester resin of low-melting point which scarcely possesses crystallinity have to be used, have increased in various applications such as paper containers for liquid, flavor-barrier sheet of snack packages, cap materials for APET, easy-peel material, extrusion wire coating, heat seal material, PET film modifier, softener, coil coating, shrink film, aroma retention heat seal film, binder fiber, composite fiber, heat-shrinkable film, adhesives, gas-barrier bottle, etc. When such resins are dried at temperatures above the glass transition point, they become fluidized, stick to the inside of drying container or the pellets adhere one another, causing blocking.

For solving the above problem, JP-A-9-164526 discloses a drying method of amorphous copolyester resin in which a crystalline polyester powder is mixed with an amorphous copolyester resin pellet and they are dried, preferably, in the agitated. However, since, in this method, the amorphous copolyester resin to be dried must be in a pellet-form, this method is unable to be applied for drying a polyester resin difficult to be pelletized. In addition, in this method, only limited drying equipment is able to be used. Furthermore, a comparatively large amount of crystalline polyester powder is required with respect to the amorphous copolyester resin.

It is a further object of the present invention to provide a process for drying thermoplastic polyester resin including an amorphous copolyester resin, low-melting point polyester resin or the like without causing fusion and sticking to the drying container inside or mutual adhesion of pellets, at high temperature, in a short time, and easily, even when they are dried at high temperatures causing blocking.

The inventors have conducted intensive studies in order to attain the above object. As a result, the inventors have found that a multilayer pellet having a core-sheath structure, wherein the core contains a thermoplastic polyester resin including an amorphous copolyester resin, a low-melting-point polyester resin or the like and the sheath contains a thermoplastic resin with specific properties against the core section, does not cause the said problem even when they are dried at high temperature that would cause blocking of the thermoplastic polyester resin used for the core. The pellet can be manufactured from a strand obtained by simultaneously extruding a thermoplastic polyester resin used for core and a thermoplastic resin used for sheath, and, in the strand, the thermoplastic polyester resin used for core is covered with a thermoplastic resin used for sheath and, if an appropriate resin is used, can be supported by a thermoplastic resin used for sheath. Therefore, even if the thermoplastic polyester resin used for core is a polyester resin difficult to be pelletized, it can be pelletized by support of the thermoplastic resin used for sheath. The present invention of a process for drying thermoplastic polyester resin was thus completed.

As the multilayer pellets, those manufactured by an above-mentioned process for manufacturing multilayer pellets of the present invention can be used.

SUMMARY OF THE INVENTION

The present invention provides a process for manufacturing multilayer pellets having a core-sheath structure with a molding material forming a sheath which covers around the outer circumference of another molding material forming a core, which comprises the following processes (a) through (c):

Process (a): supplying the core material and the sheath material to a die equipment having a plurality of extrusion-forming parts arranged along a circumference, Process (b): extruding a plurality of multilayer strands from the extrusion-forming parts by covering around the outer circumference of the core material concentrically with the sheath material, and Process (c): cutting the extruded multilayer strands to manufacture multilayer pellets.

The present invention also provides a master-batch pellet with improved brittleness, which comprises thermoplastic resin and at least one compound (A) selected from pigments and additives; and which has a core-sheath structure wherein the core layer contains the thermoplastic resin and the compound (A) and is covered with the sheath layer containing thermoplastic resin, and 80 wt % or more of the compound (A) are contained in the core layer.

The present invention also provides a process for manufacturing the said master-batch pellets, which comprises melt-extruding a thermoplastic resin and at least one compound (A) selected from pigments and the additives into a core-sheath strand so that 80 wt % or more of the compound (A) is contained in the core, and cutting the strand into pellets after the strand is cooled.

The present invention further provides a process for drying thermoplastic polyester resin at high temperatures causing blocking which comprises drying multilayer pellets having a core-sheath structure in which the thermoplastic polyester resin to be dried is used as the core and a thermoplastic resin which does not cause blocking at the said drying temperature is used as a sheath.

The thermoplastic polyester resin pellets of the present invention providing a process for drying thermoplastic polyester resin are characterized in that they do not cause blocking at drying temperature at which the said thermoplastic polyester resin to be dried itself causes blocking. Due to the characteristic, a high drying temperature, which causes blocking of the thermoplastic polyester resin to be dried, can be employed. As the result, drying can be accelerated and moisture in the thermoplastic polyester resin can be removed effectively in a short time.

BRIEF DESCRIPTION OF THE DRAWINGS

FIG. 1 is a schematic representation (a) showing the embodiment of the present invention and general structure of the manufacturing equipment, and an enlarged cross-sectional drawing (b) of the multilayer strand manufactured.

FIG. 2 is a cross-sectional view of the die equipment.

FIG. 3 is a front view of the die equipment.

FIG. 4 is a schematic representation showing the flow of molding materials.

FIG. 5 is a cross-sectional view of the die equipment showing another embodiment.

FIG. 6 is a front view of the die equipment used in another embodiment.

Figure 1A:
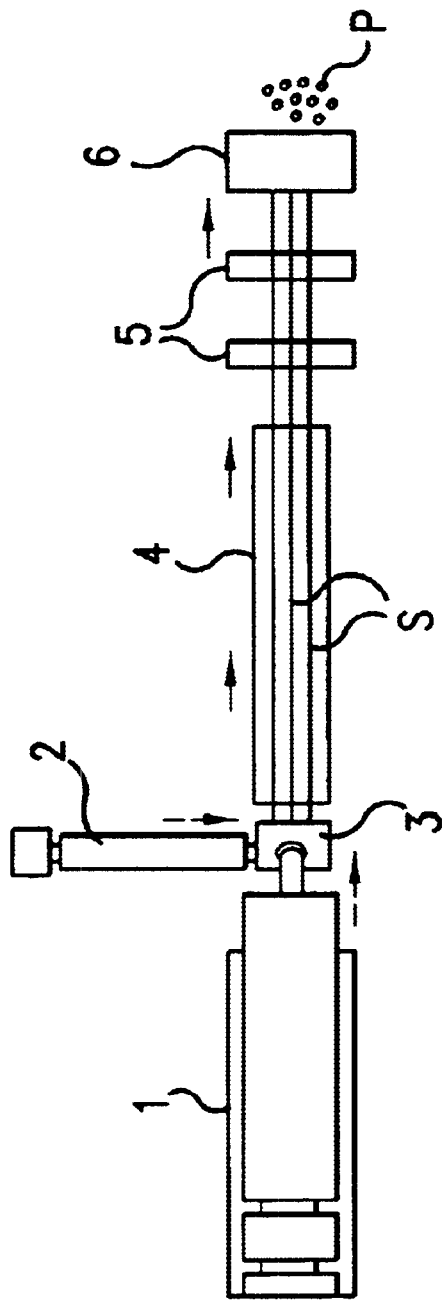
FIG. 1

DESCRIPTION OF REFERENCE NUMERALS 1, 2. Extruder
3. Die equipment
4. Cooling water bath
5. Water dripping device
6. Pelletizer
10. Die equipment proper
12. Extrusion port
14. Core nozzle
20. Core material supply port
22. Main supply route
24. Radial supply route
26. Parallel supply route
40. Sheath material supply port
42. Main supply route
44. Radial supply route
46. Parallel supply route
50. Extrusion board
52. Holder hole
54. Retainer member
60. Sheath holder

DETAILED DESCRIPTION OF THE INVENTION

Molding Materials

In the process for manufacturing multilayer pellets of the present invention, various resin materials applicable to general pellet manufacturing can be used for the molding materials.

The raw materials supplied to a multilayer pellet manufacturing equipment mentioned later may be solid such as powders, etc. as well as liquid.

Multilayer Pellet Manufacturing Equipment

Basically, the multilayer pellet manufacturing equipment used for conducting the process for manufacturing multilayer pellets of the present invention is equipped with the same construction as that of the molding machine used in general strand pellet manufacture and strand forming.

For the manufacture of multilayer pellets, the following structures may be equipped.

An extruder which separately heats and melts raw materials for core material and sheath material, die equipment for strand-forming for forming molten core material and sheath material fed from the extruder into multilayer strands, a pelletizer for cutting multilayer strands extruded from the die equipment and manufacturing multilayer pellets.

A cooling equipment such as a cooling water bath for cooling multilayer strands may be equipped.

A hopper for feeding raw materials to the extruder or an equipment for recovering multilayer pellets manufactured by the pelletizer or transporting them to the subsequent process may be equipped.

Die Equipment

The basic structure of the die equipment is common to general die equipment for strand forming but is also equipped with a structure for forming multilayer strands.

Supply Port

The core-material supply port for feeding core material and the sheath-material supply port for feeding sheath material are equipped.

The core-material supply port and the sheath-material supply port may be provided at any places on the external surface of the die equipment, but they are desirably arranged in such a manner as to achieve smooth flow of materials to the extruding forming section. Specifically, they may be provided at the position which becomes the side surface or the back surface with respect to the surface to which the extrusion forming section is arranged.

To the core-material supply port and the sheath-material supply port, separate extruders are connected, respectively. The layout of each supply port is decided with the installation, the construction or the like of extruders taken into account.

Extrusion-Forming Section

An extrusion-forming section for forming multilayer strands is equipped. From the extrusion port equipped at the extrusion-forming section the core material is linearly extruded at the center and at the same time, the sheath material concentrically covered around the outer circumference of the core material is extruded together with the core material.

The outside diameter of the extrusion port is established in accord to the outside diameter of the multilayer strand. However, with the deformation at the time of molding taken into account, the outside diameter of the multilayer strand may not be perfectly same as that of the extrusion port. Excessively small outside diameter of the extrusion port may prevent the molding material from being thoroughly extruded, and excessively large outside diameter may prevent stable extrusion-forming of strands.

The extrusion-forming section is arranged at a plurality of places along the same circumference. As a result, a plurality of multilayer strands extruded from each extrusion port are fed to the downstream side with composing cylindrical faces and in the parallel condition. The number of extrusion-forming sections varies in accord with the conditions such as the shape of the die equipment, diameter of multilayer strand, extrusion-discharge rate, etc., and may be set to a proper number in the range from about 3 to scores of sections.

For the construction of the extrusion-forming section, it is possible to combine core nozzles to the inside of which core material is fed with sheath holders arranged in specified intervals around the outer circumference on the head end side of the core nozzle. The sheath material is fed between the sheath holder and the core nozzle.

The outside diameter of core material can be adjusted by setting the inside diameter of the core nozzle. The sheath material thickness and the ratio of the core material to the sheath material in the radial direction are able to be adjusted by setting the outer profile of the core nozzle and the inner profile of the sheath material. Tapering the inner circumference of the sheath holder that corresponds to the head end of the core nozzle enables the adjustment of sheath material thickness covered over the core material by adjusting the sheath holder and the core nozzle locations in the longitudinal direction.

It is also possible to equip the above-mentioned combination structure of the core nozzle and the sheath holder to a plurality of extrusion-forming, sections, respectively.

The extrusion-forming section equipped with a combination structure of the core nozzle and the sheath holder may be removably equipped to the die equipment proper for each extrusion-forming section. In such event, thickness of core material and sheath material as well as balance in the circumferential direction may be adjusted for each extrusion-forming section. It is possible to accurately align the centers of the core nozzle and the sheath holder.

For a means to removably install the extrusion-molding section to the die equipment proper, any removable mounting means adopted in the normal mechanical equipment such as fitting, bolt tightening, and others may be adopted.

Supply Route

The supply route is a passage of molten material that guides the core material and the sheath material from the core material supply port and sheath material supply port to the extrusion-forming section and the core material supply route and the sheath material supply route are separately provided.

The core material supply route extends first from the core material supply port to the center axis of the circumference on which a plurality of extrusion-forming sections arranged. Thereafter, it is extended in the radial direction from the center axis towards each extrusion-forming section. The radial supply routes may be arranged on a plane that crosses at right angles with the center axis or may be arranged in a conical surface slanted forward. In this kind of conical radial supply route, the material flow becomes smooth and can be uniformly divided in a plurality of directions. Before the radial supply route, a part that extends along the center axis may be provided.

The supply route from the center axis to each extrusion-forming section equipped with the same construction at all the extrusion-forming sections is desirable from the viewpoint of uniformly supplying the material to the extrusion-forming section.

The sheath supply route extends from the sheath material supply port to the center axis of the circumference on which a plurality of extrusion-forming sections are arranged. Thereafter, it extends in the radial direction from the center axis towards each of extrusion-forming section. The more specific construction is common to the core-material supply route.

When there is a part extending along the center axis in the core material supply route and sheath material supply route, both are provided in such a layout that allows both to overlap each other in front and at rear on the center axis but prevents interference with each other. The radial part of the sheath material supply route may be located in front of the radial part of the core material supply route, that is, at the side closer to the extrusion-forming section.

Multilayer Strand Forming

The core material and sheath material supplied from the extruder to the die equipment in the molten state flow through the relevant supply routes and distributed to a plurality of extrusion forming section. In each supply route, the core material and sheath material flowing from the center axis direction to radial direction are uniformly divided and flow under the same conditions. As a result, at a plurality of extrusion-forming, section, forming of multilayer strands by core material and sheath material takes place under the same conditions.

The ratio of thickness of core material to sheath material in the multilayer strand can be adjusted by adjusting the supply rate of core material and the sheath material to the die equipment. For example, in the case of a twin-screw extruder, it is adjusted by using a feeder controlling the supply weight. In the case of mono-axial extruder, is may be adjusted, for example, by adjusting the screw rotation. A gear pump may also be used.

The layer structure of the multilayer strand is also varied by the size or structure of the extrusion-forming section. For example, setting of internal and outside diameters of the core nozzle described above, inside diameter of the sheath holder located at the outside of the core nozzle, inside diameter of the extrusion port at the head end, etc. determines the size and structure of the multilayer strand.

The external diameter of the multilayer strand and the ratio of thickness of core material to sheath material are set as required in accordance with the application purposes and required performance of the multilayer pellets. For example, the outside diameter of the multilayer strand is generally set between 1 and 10 mm, and preferably between 3 and 7 mm.

Manufacturing of Multilayer Pellet

The extrusion-formed multilayer strand is cut by a pelletizer before or after it is cooled as required and formed into multilayer pellets.

For cooling, a general cooling means is adopted. For example, a method for immersing the multilayer strand into cooling water in the water tank is adopted. The water-cooled multilayer strand is preferably sent to the pelletizer after moisture adhering to the surface removed by a water dripping device.

The pelletizer cuts the multilayer strand into a specified length by driving a rotary knife, or the like. By cutting the multilayer strand as it is, double columnar form multilayer pellets comprising the core material and the sheath material are obtained. By rounding the cut end face, spherical or elliptical or disk-form multilayer pellets with the overall circumference including the end face of the core material coated with sheath material are obtained.

In general, multilayer pellets with outside diameter of about 2 to 8 mm are manufactured.

An Embodiment of the Invention

The embodiment shown in FIG. 1 shows the overall structure of the multilayer pellet manufacturing equipment (a) and cross-sectional structure of the manufactured multilayer strand or multilayer pellet (b).

As shown in FIG. 1(a), an extruder 1 for core material and an extruder 2 for sheath material are connected from the direction in which the two machines cross each other at right angles. In the core material extruder 1, plastic material for core material is supplied and heated and melted. In the sheath material extruder 2, plastic material for sheath material is supplied and heated and melted. The heated and melted materials are supplied to the die equipment 3.

Figure 1B:
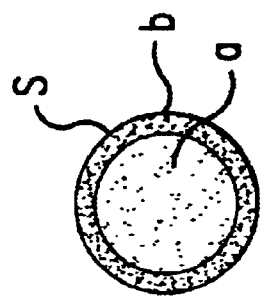

From the die equipment 3, a plurality of multilayer strands S are extruded and formed in such a manner to be parallel to each other and to form a cylindrical surface. As shown in FIG. 1(b), the cross-sectional profile of the multilayer strand S is such that the core material a is arranged at the center and the outer circumference is coated with the sheath material b in a comparatively small thickness.

The extruded and formed multilayer strand S is sent to a cooling water bath 4, where it is cooled and solidified.

The multilayer strand S coming out of the cooling water bath 4, is sent to the pelletizer 6 via the water dripping device 5.

At the pelletizer 6, multilayer strand S is cut into small pieces and multilayer pellets P are obtained. The cross sectional structure of the multilayer pellet P is also of the core-sheath structure comprising core material a and sheath material b as shown in FIG. 1(b).

Die Equipment

Figure 2:
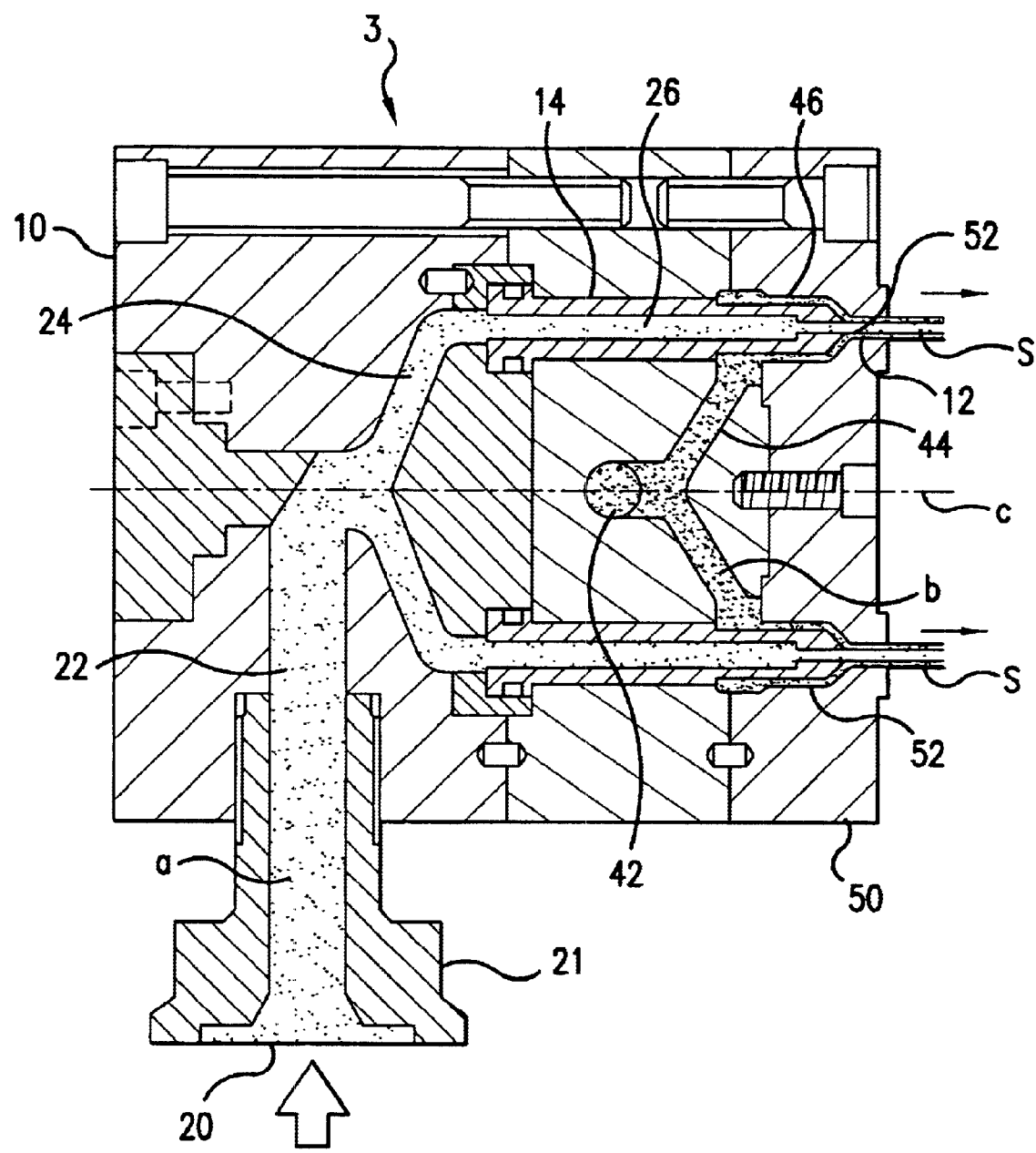
FIG. 2
Figure 3:
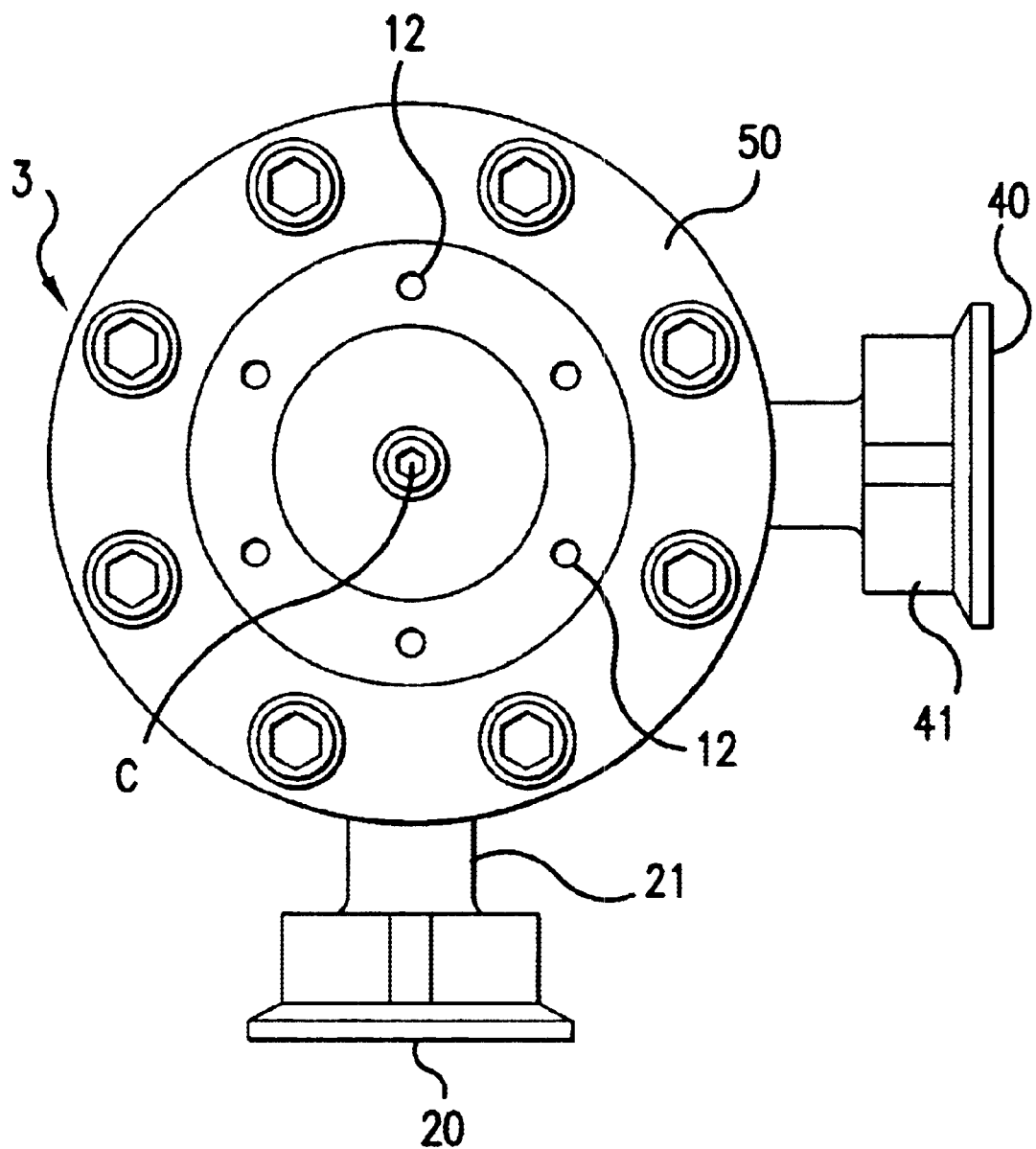
FIG. 3

As shown in FIG. 2 and FIG. 3, the die equipment has a nearly cylindrical main body 10.

As shown in FIG. 3 in detail, on the cylindrical circumferential surface of the main body 10, a core material supply tube 21 and a sheath material supply tube 41 are mounted at the positions that crosses at right angles each other. The end surface of the core material supply tube 21 serves as the core-material supply port 20, while the end surface of the sheath material supply tube 41 serves as the sheath material supply port 40. The core material supply port 20 is connected to the core material extruder 1 and the sheath material supply port 40 to the sheath material extruder 2.

At the head end surface of the main body 10, extrusion ports 12 are arranged at a plurality of places along the circumference. In the case of the drawing, the number of extrusion ports 12 is 6, which are spaced at equal intervals. The line obtained by extending the center of the circumference composed by extrusion ports 12 in the direction that crosses at right angles with the plane including the circumference expresses the center axis C.

As shown in FIG. 2, core material supply routes 22, 24, 26 from the core material supply port 20 to each extrusion port 12 and sheath material supply routes 42, 44, 46 from the sheath material supply port 40 (see FIG. 3) to each extrusion port 12 are installed.

The core material supply route comprises a comparatively thick main supply route 22 that extends from the core material supply port 20 to the center axis C at the center of the main body 10, and then, extends along the center axis C, a plurality of radial supply routes 24 which follow the main supply route 22 and are thinner than the main supply route 22, and extend along the conical surface slightly at angle in front in the radial direction, and parallel supply routes 26 that follow radial direction supply routes 24, extend in front parallel to the center axis C, and reach extrusion ports 12.

The parallel supply route 26 passes the center of the cylindrical core nozzle 14 removably embedded in the main body 10 and extends towards the extrusion port 12.

The head end of the core nozzle 14 is tapered and is located inside the holder hole 52 of the extrusion board 50 arranged at the front surface of the main body 10. To the extrusion board 30, a holder hole 52 is provided at every extrusion-forming section and the head end of the holder hole 52 serves as an extrusion port 12.

The sheath material supply route comprises a comparatively thick main supply route 42 that extends from the sheath material supply port 40 to the center axis C at the center of the main body 10, and then, extends along the center axis C, a plurality of radial supply routes 44 which follow the main supply route 42 and are thinner than the main supply route 42, and extend slightly at angle in front in the radial direction, and parallel supply routes 46 that follow radial direction supply routes 44, extend in front parallel to the center axis C, and reach extrusion ports 12.

The main supply route 42 of the sheath material is arranged on the forward side closer to the extrusion port 12 than the main supply route 22 of the core material. The radial direction supply route 44 of the sheath material continues to the inner circumference of the core nozzle 14. The parallel supply route 46 of the sheath material extends in the clearance between the outer circumference of the core nozzle 14 and the holder hole 52 and reaches the extrusion port 12.

The thickness of the sheath material b varies in the clearance between the head end outside diameter of the core nozzle 14 and the holder hole 52 and the ratio of the thickness of the core material a to the sheath material b is determined. Adjusting the core nozzle 14 position in the longitudinal direction parallel to the center axis C can adjust the thickness of the sheath material b.

Forming of Multilayer Strand

Core material a and sheath material b supplied from each of the extruders 1, 2 to the die equipment 3 in the molten state flow in the core material supply route 20–26 and the sheath material supply route 40–46, respectively. At the extrusion port 12, by allowing the core material a to flow at the center and the sheath material b to flow in the outer circumference, a multilayer strand S of so-called core-sheath structure is formed.

Figure 4A:
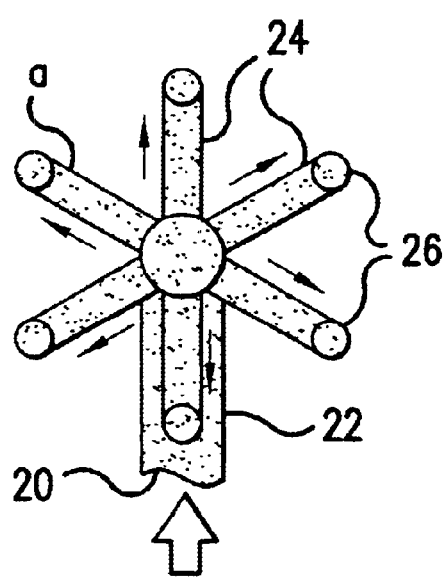
FIG. 4
Figure 4B:
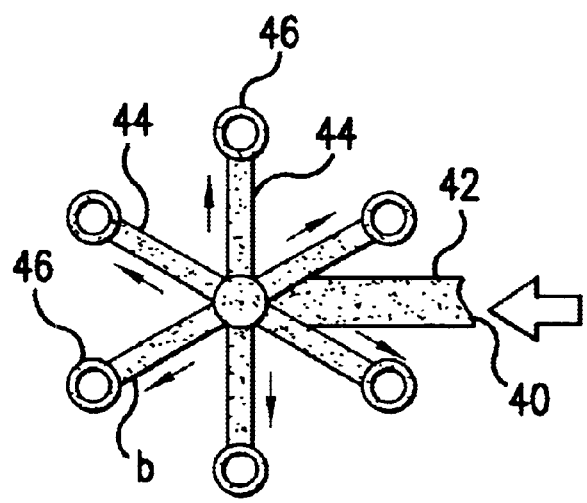

In the core material supply-route 20–26, the core material a sent from the main supply route 22 to the position of the center axis C is uniformly distributed from the center axis C to each of radial direction supply routes 24. In the sheath material supply route 40–46, the sheath material b sent from the main supply route 42 to the position of the center axis C is uniformly distributed from the center axis C to each of radial direction supply routes 44. As shown in FIG. 4, since both the core material a and the sheath material b are sent to the parallel supply routes 26, 46 in the state uniformly distributed by the radial direction supply routes 24, 44, it is possible to prevent generation of difference in supply rate of the core material a and the sheath material b at a plurality of extrusion-forming sections or variation in thickness ratio of the core material a to the sheath material b in the multilayer strand S.

At the extrusion board 50, the core material a and the sheath material b that have flown in the parallel supply routes 26, 46 in and outside the circumference of the core nozzle 14 join at the head end of the core nozzle 14, and the outside diameter is adjusted from the holder hole 52 to the extrusion port 12, and multilayer strand S with the sheath material b covered at a specified ratio of thickness to the core material a is formed.

Manufacture of Multilayer Pellets

The multilayer strand S extruded and formed with the die equipment is sent out in such a manner that six pieces of multilayer strand S form a cylinder in accord with the arrangement structure of extrusion ports 12.

As shown in FIG. 1, a plurality of multilayer strands S enter the cooling water bath 4 in the parallel state, and are cooled while traveling immersed in the water. The multilayer strand S coming out from the cooling water bath 4 is cut by a pelletizer 6 after moisture adhering to the surface is removed by a water dripping device 5 and become multilayer pellets.

At the pelletizer 6, by a cutting blade rotatably driven, a plurality of multilayer strands S arranged in the circumferential form are simultaneously cut.

Other Embodiments of the Invention

Figure 5:
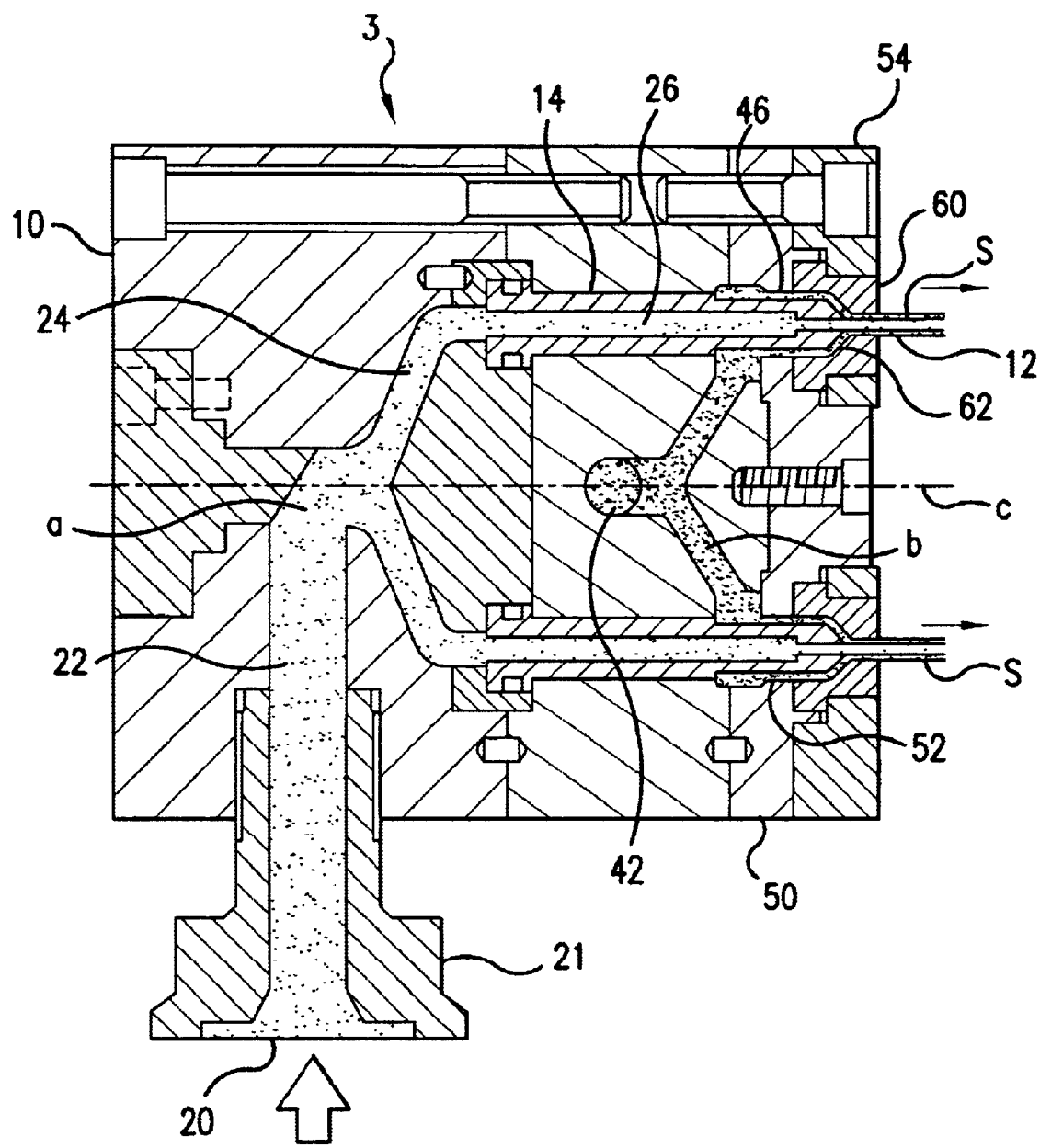
FIG. 5
Figure 6:
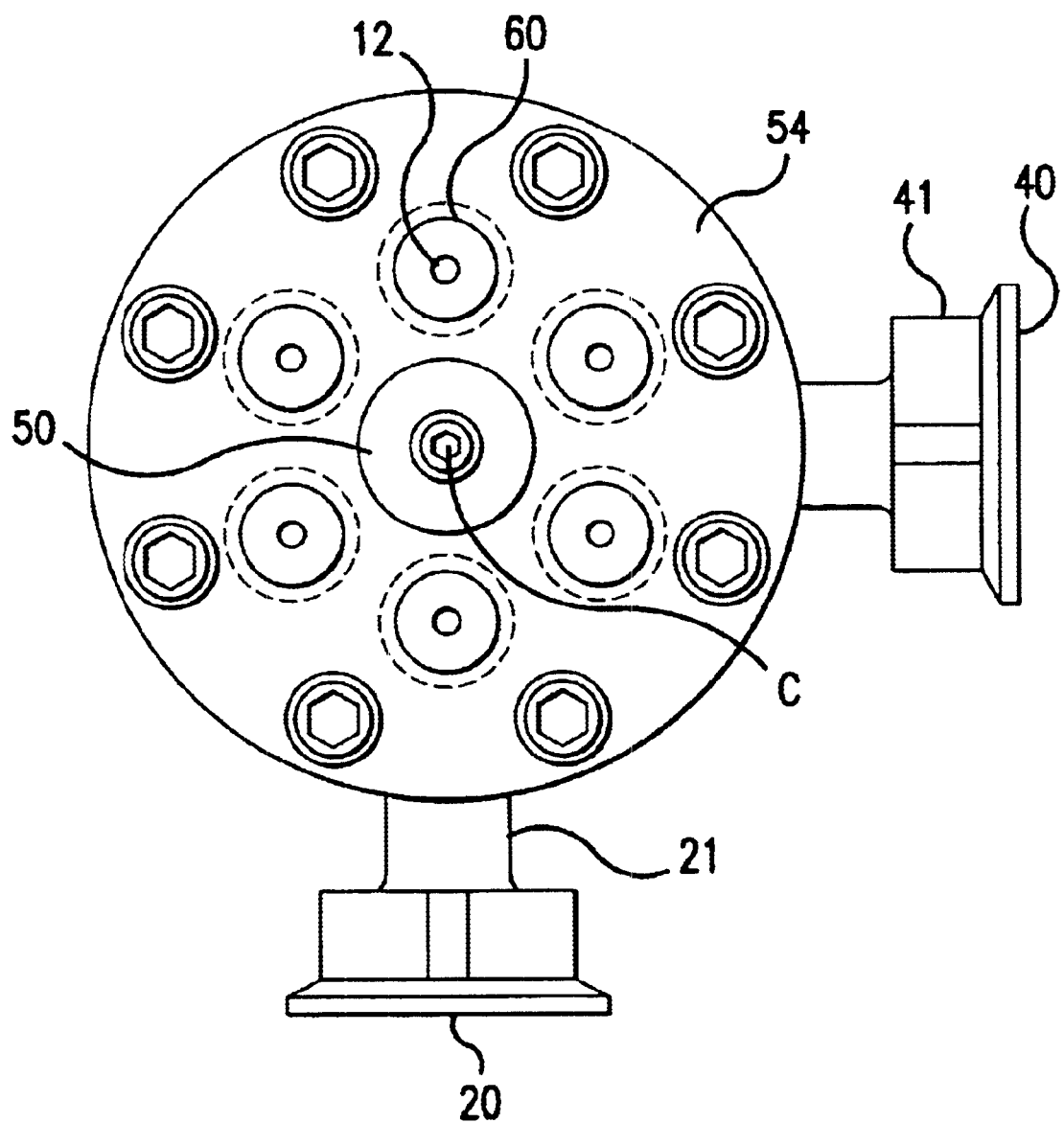
FIG. 6

The embodiments shown in FIG. 5 and 6 differ in structure of the die equipment from that of the embodiment described above.

However, the basic structure is common to the above-mentioned embodiment, and the different structural parts are mainly explained.

The layout structure of the main body 10 of the die equipment 1, core material supply routes 20–26, and sheath material supply routes 40–46 is common to that of the above-mentioned embodiment.

However, the structure of the extrusion board 50 differs. That is, the part forming a plurality of extrusion-forming sections arranged along the circumference is composed by a sheath holder 60, different parts from the extrusion board 50 proper.

The sheath holder 60 has a holder hole 62 that surrounds the outer circumference of the core nozzle 14 and the head end of the holder hole 62 is used for the extrusion port 12.

The whole sheath holder 60 is of a stepped cylinder form, and rear parts of sheath holders 60 are fitted into a plurality of dented parts, respectively, which are provided along the circumference on the front surface of the extrusion board 50. By bolt-tightening the retainer member 54 equipped with a fixing hole to which the front part of the sheath holder 60 is fitted to the front surface of the extrusion board 50, each sheath holder 60 is fixed.

The core material a and the sheath material b are supplied to the extrusion hole 12 via the holder hole 52 of the extrusion board 50 and the holder hole 62 of the sheath holder 60 from parallel supply routes 26, 46 arranged on the inside and outside circumferences of the core nozzle 14 to form the multilayer strand S with the outer circumference of the core material a covered with the sheath material b.

In the above-mentioned embodiment, adjusting the fixing condition of the sheath holder 60, geometry of the holder hole 62 of extrusion port 12, and the fixing condition and geometry of the core nozzle 14 can accurately set and adjust the extruded profile of multilayer strand S in a plurality of extrusion forming sections.

For example, if the center alignment of the core nozzle 14 and the extrusion port 12 deviates, thin and thick portions in sheath material b in the multilayer strand S are generated in the circumferential direction, but aligning to the core position of the core nozzle 14 and adjusting the core position of the sheath holder 60 can achieve the multilayer strand S with uniform thickness of the sheath material b throughout the circumference.

As a result, even if a plurality of multilayer strands S are formed simultaneously at a plurality of extrusion forming sections, the multilayer strand S free of variation in quality performance can be easily obtained.

Now, a process for manufacturing multilayer pellets of the present invention is explained more concretely with specific examples in which multilayer pellets were manufactured using the multilayer pellet manufacturing equipment shown in FIG. 1.

Die equipment 3: The equipment equipped with sheath holders 60 shown in FIG. 5 and 6. Extrusion ports 6 places.

Core material a: Low-density polyethylene resin (MI=2 g/10 min, d=0.92 g/cc) Colored in blue.

Sheath material b: Low-density polyethylene resin (MI=2 g/10 min, d=0.92 g/cc) Colored in white.

Core material extruder 1: 46 mm$\phi$ two-flighted twin-screw extruder. L/D=35.

Sheath material extruder 2: 50 mm$\phi$ single-screw extruder. L/D=25.

EXAMPLE 1

The core material a and the sheath material b are supplied from each of the extruders 1, 2 to the die equipment 3 at 180° C. The ratio of supply rate of the core material a and the sheath material b, the core-to-sheath ratio, is core/sheath= 50/60 wt %.

After 6 pieces of multilayer strand S extruded and formed by the die equipment 3 are cooled in the cooling water bath 4, the strands S were cut by a pelletizer 6 and multilayer pellets P, which were 3.0 mm$\phi$ in outside diameter and 3.0 mm long, were obtained.

EXAMPLE 2

Multilayer pellets P were manufactured under the same conditions as those of Example 1 except the core-to-sheath ratio changed to core/sheath=70/30 wt %.

EXAMPLE 3

Multilayer pellets P were manufactured under the same conditions as those of Example 1 except the core-to-sheath ratio chanced to core/sheath=90/10 wt %.

The sheath thickness of the multilayer pellets obtained in each example was measured. The measurement was carried out by an optical microscope. Table 1 shows the results.

TABLE 1

|  | Core-to-sheath ratio Weight % | Sheath thickness (mm) | |
| --- | --- | --- | --- |
|  |  | Theoretical value | Measured value |
| Example 1 | 50/50 | 0.44 | 0.43 to 0.45 |
| Example 2 | 70/30 | 0.25 | 0.24 to 0.26 |
| Example 3 | 90/10 | 0.08 | 0.07 to 0.09 |

The results of the above measurement verified that the multilayer pellet P obtained in the example of the present invention possesses the sheath thickness same as the theoretical value, and that the multiple pellet P provides high accuracy and excellent quality performance.

A process for manufacturing multilayer pellets according to the present invention enables efficient manufacture of multilayer pellets by using the die equipment with a plurality of extrusion-forming sections arranged along the circumference for molding a multilayer strand which is the previous phase of multilayer pellets.

The die equipment used for the process for manufacturing multilayer pellets according to the present invention, which supplies core materials and sheath materials to each of the extrusion-forming section located in a plurality of places along the same circumference via supply routes extending the radial direction from the center axis of the circumference, enables the uniform supply of the core material and the sheath material to a plurality of extrusion-forming sections and enables the stable thickness ratio and arrangement profile of core material to sheath material in the multilayer strand formed at each extrusion-forming section.

In the present invention providing a master-batch pellet with improved brittleness, the above-mentioned conventional problems regarding a master-batch are solved and brittleness thereof is improved by making the molten-extruded strand profile into a core-sheath structure in which the outside of the brittle layer containing the compound (A) of pigments, etc. is covered with a tough layer. That is, because by allowing the majority (80 wt % or more) of the compound (A) to be contained in the core layer, the sheath layer becomes a tough layer that contains little or no compound (A), plays a role for reinforcing the brittle core layer and can prevent strand breakage at the time of melt-extruding or chip generation at the time of cutting.

In the present invention for providing a master-batch, it is essential for the compound (A) to be contained in the core layer by 80 wt % or more, and preferably 90 wt % or more, and more preferably 95 wt % or more. If the ratio of the compound (A) contained in the core layer is below 80 wt %, a greater amount of the compound (A) is contained in the sheath layer, and the sheath layer becomes brittle and is unable to play a reinforcing role.

The diameter of the strand to be melt-extruded is not particularly limited, but preferably between 0.5 and 5 mm, and more preferably between 2 and 4 mm.

For a method to cool the strand after melt-extruding, a method to allow the strand to pass a cooling water tank is generally practiced.

By cutting the cooled core-sheath type strand into a length preferably between 1.0 and 5.0 mm, and more suitably between 2.5 and 3.5 mm, the master-batch resin pellet according to the present invention is obtained. The resin pellet according to the present invention for providing a master-batch has a structure in which the core layer containing a thermoplastic resin and compound (A) is covered with a sheath layer containing a thermoplastic resin, and 80 wt % or more, preferably 90 wt % or more, more preferably 95 wt % or more, of the compound (A) are contained in the core layer.

The ratio of core layer to sheath layer in the resin pellet according to the present invention for providing a master-batch is not particularly limited, but in order to achieve successful exhibition of the effects of the present invention, the ratio of core layer to sheath layer by weight is preferably between 50/50 and 99/1, and more suitably between 80/20 and 90/10. When the core layer is less than the said range, it is difficult to contain the compound (A) at a high concentration. On the other hand, if the sheath layer is less than the said range, the sheath layer becomes thin and becomes unable to successfully play the role of reinforcement.

It is desirable for the resin pellet according to the present invention for providing a master-batch to contain a large amount of compound (A), and the compounding amount of the compound (A) is desirably 15 wt % or more for organic pigmented, 35 wt % or more for inorganic pigments, 25 wt % or more for the inorganic additives, and 5 wt % or more for organic additives.

Examples of thermoplastic resin used for the present invention for providing a master-batch include polystyrene, polypropylene, polyethylene, AS resin, ABS resin, (meth) acrylic resin, vinyl chloride based resin, poly(vinylidene chloride), poly(vinyl acetate), polyolefin, polyethylene terephthalate, polybutylene terephthalate, polyacetal, polycarbonate, polyamide, acetylcellulose, fluororesin, polyester resin, aryl resin, silicone resin and thermoplastic elastomer. Among them polystyrene, polypropylene, polyethylene polyethylene terephthalate and polyamide are preferable. These thermoplastic resins are used individually or by mixing two or more kinds.

In the present invention for providing a master-batch, it is desirable to use thermoplastic resin same as or similar to natural resin from the viewpoint of properties of the natural resin or fluidity of the masterbatch. The thermoplastic resins used for the core layer and the sheath layer are preferably same as or similar to each other.

The compound (A) used in the present invention for providing a master-batch should be at least one kind selected from pigments and additives, and these compound (A) are used individually or by mixing two or more kinds. For the pigment used in the present invention for providing a master-batch, any known organic pigment, inorganic pigment, extender and the like may be used. Examples of the organic pigment include azo pigments such as insoluble azo and condensed azo, thren system such as anthraquinone, perynone, perylene and thioindigo, phthalocyanine system such as phthalocyaanine blue and phthalocyanine green, nitroso dye such as naphthol green-B and naphtol green-Y., quinacridone, dioxazine, isoindolinone, pyrropyrrole, aniline black, and organic fluorescent pigments. Examples of inorganic pigment include natural pigments such as clay, barite, mica, etc., chromate such as chrome yellow, zinc yellow, barium yellow, etc., ferrocyanide such as Prussian blue, etc., sulfide such as zinc sulfide, etc., sulfate such as barium sulfate, etc., oxide such as chromium oxide, zinc white, titanium white, red iron oxide, iron black, chromium oxide, etc., hydroxide such as aluminum hydroxide, etc., silicate such as calcium silicate, ultramarine blue, etc., carbonate such as calcium carbonate, magnesium carbonate, etc., carbon such as carbon black, pine soot, bone black, graphite, etc., metallic powder such as aluminum powder, bronze powder, zinc powder, etc., and other burned pigments. Examples of extender include calcium carbonate, barium sulfate, talc, etc. These pigments are used individually or by mixing two or more kinds. Dyes may also be used to the range that would not impair resin properties.

Additives used in the present invention for providing a master-batch are used for the purpose of improving resin properties such as processibility, flexibility, elasticity, brittleness, manageability, etc., resin performance such as stability, durability, flame-retardant, heat insulation, etc., workability such as mold release, kneading, etc., and are not particularly limited unless they cause pyrolysis at the time of adding. Examples thereof include plasticizer, antioxidant, UV absorbent, light stabilizer, flame-resistant agent, anti-bacterial agent, antistatic agent, copper inhibitor, metal deactivator, tackifier, lubricant, slipping agent, internal mold release agent, defogging agent such as drip inhibitor, fog dip inhibitor, deodorant, surfactant, wetting agent, preservatives, filler, reinforcing agent, stabilizer, heat insulator, foam agent, damping material, impact resistance improver, surface treating agent, dispersant, etc.

Examples of plasticizer used in the present invention for providing a master-batch include phthalate derivatives such as dimethyl phthalate, dibutyl phthalate, diethyl phthalate, dibeptyl phthalate, di-2-ethylhexyl phthalate, octyl decyl phthalate, etc., phthalic acid isomers such as dimethy isophthalate, dioctyl isophtalate, etc., tetrahydrophthalic acid derivatives such as di-2-ethyl hexyl tetrabydrophthalate, etc., phosphate derivatives such as tripheyl phosphate, trichloroethyl phosphate, bisphenol A dipheyl phosphate, etc., adipic acid derivatives such as dimethyl adipate, dibutyl adipate, diisodecyl adipate, diisobutyl adipate, etc., sebacic acid derivatives such as di-n-butyl sebacate, di-n-octyl sebacate, butyl benzyl sebacate, etc., azelaic acid derivatives such as d-2-ethyl hexyl azelate, dimethyl azelate, dibenzyl azalate, etc., citric acid system such as triethyl citrate, acetyl triethyl citrate, tributyl citrate, etc., epoxy system such as epoxidated soybean oil, epoxy stearic butyl, epoxy stearic octyl, etc., polyester system such as polypropylene adipate, polypropylene sebacate, etc., chlorinated system such as chlorinated paraffin, chlorinated aliphatic ester, etc., glycolic acid system such as methylphthalyl ethyl glycolate, ethyl phthalyl ethyl glycolate, etc., trimellitic acid system such as tri-2-ethyl hexyl trimellitate, etc., ricinolic acid system such as methyl acetyl ricinoleate, butyl acetyl ricinoleate, etc., butyl oleate, etc. These compounds can be used singly or two or more kinds oft them can be used in combination.

Examples of antioxidant used in the present invention for providing a master-batch include phenol system such as 2,6-di-t-butyl-p-Cresol, pentaerythritol-tetrakis-(3,5-di-t-butyl-4-hydroxyphenyl) propionate methyl phenol, octadecyl-3-(3,5-di-t-butyl-4-hydroxyphenyl) propionate, etc., phosphorus system such as tris(2,4-di-t-butylphenyl) phosphate, distearylpnetaerythritol diphophate, tetrakis (2,4-di-t-butylphenyl)-4,4'-biphenylene phosphonate, etc., sulfur system such as distearyl-3,3'-thiodipropionate, pentaerythritol-tetrakis-(3-laurylthiopropionate), etc. These compounds can be used singly or two or more kinds oft them can be used in combination.

Examples of UV adsorbent and light stabilizer used in the present invention for providing a master-batch include salicylic acid derivatives such as phenyl salicylate, p-t-butyl salicylate, etc., benzophenone system such as 2,4-dibydroxy benzophenone, 2-hydroxy-4-methoxybenzophenone, etc., benzotriazole system such as 2-(2'-hydroxy-3',5'-di-t-butylphenyl)benzotriazole, 2-(2'-hydroxy-3'-t-butyl-5'-methylphenyl)-5-chlorobenzotriazole, etc., hindered amine system such as bis(2,2,6,6-tetramethyl-4-piperidyl) sebacate, dimethyl succinate-1-(2-hydroxyethyl)-4-hydroxy-2,2,6,6-tetramethyl piperidine condensation product, etc. These compounds can be used singly or two or more kinds oft them can be used in combination.

Examples of flame-retardant used in the present invention for providing a master-batch include phosphoric acid system such as allkyl diallyl phosphate, cresyl diphenyl phosphate, octyl diphenyl phosphate, triallyl phosphate, tributyl phosphate, triphenyl phosphate, tris($\beta$-chloroethyl) phosphate, tris(dichloropropyl) phosphate, tris(2,3-dibrompropyl) phosphate, tris(bromo-chloropropyl) phosphate, etc., chlorine system such as chlorinated paraffin, chlorinated polyphenyl, perchloropentacyclodecane, etc., bromine system such as tetrabromoethane, tetrabromobutane, hexaborombenzene, decabromodiphenyloxide, polydibrornophenyloxide, bis(tribromophenoxy)ethane, ethylene bisbromonorbornane dicarboxyimide, ethylene bistetrabromophthalimide, etc. reaction type such as chlorendic acid anhydride, tetrabromo phthalic anhydride, tetrabromo bisphenol A, dietoxy-bis-(2-hydroxyethyl)-aminomethyl phosphate, dibormcresyl alycidyl ether, etc. These compounds can be used singly or two or more kinds oft them can be used in combination. It is also possible to use at the same time the stabilizer for flame-retardant such as epoxy-based stabilizer.

For antibacterial agents used in the present invention for providing a master-batch, as the phenol ether based antibacterial agent, those having the phenol group in the intramolecular skeleton, for example, 10, 10'-oxybisphenoxa arsine, etc., as natural antibacterial agents, those having tropolone as a central skeleton, for example, hinokitiol, $\beta$-dolabulin, etc., as glycerol ester of fatty acid, lower fatty acid monoglycerol ester, sucrose fatty acid ester, polyglycerol fatty acid ester, for example, monoglyceride caprylate, monoglyceride caprate, lauric acid monoglyceride, Sugar-ester palpitate, decaglycerol monocaprate, hexaglycerol caprylate, etc., as zeolite-based compounds, part or whole of ion-exchangeable ion in zeolite-based compounds, for example, part or whole of sodium ion, calcium ion, potassium ion, magnesium ion, iron ion, etc. is substituted with ions with antibacterial property, such as silver ion, copper ion, zinc ion, ammonium ion, etc. can be exemplified. These compounds can be used singly or two or more kinds oft them can be used in combination.

Examples of antistatic agent used in the present invention for providing a master-batch include cation system such as quaternary ammonium chloride, quaternary ammonium sulfate, etc., anion system such as allkylsulphonate, alkylbeinzensulphonate, etc., non-ion system such as poly (oxyethylene) alkylamine, poly(oxyetlaylene)alkylamide, etc., amp hoteric system such as alkyl betaine type, alkyl imidazolium type, etc., conducting resin such as polyvinyl benzyl type cation, polyacrylic acid type cation, etc. These compounds can be used singly or two or more kinds oft them can be used in combination.

Examples of copper inhibitor and metal deactivator used in the present invention for providing a master-batch include 1,2,3-benzotriazole, tolyltriazole amine salt, tolyltriazole potassium salt, 3-(N-salicyloil)amino-1,2,4-triazole, etc. These compounds can be used singly or two or more kinds oft them can be used in combination.

Examples of tackifier used in the present invention for providing a master-batch include coumarone resin system such as coumarone-indene resin, coumarone resin-naphthene based oil-phenol resin-rosin mixture, etc., phenol-terpene based resin system such as p-t-butyl phenol-acetylene resin, phenol-formaldehyde resin, terpene phenol resin, polyterpene resin, xylene-formaldehyde resin, etc., synthesized polyterpene resin system such as Quinton A100 (available from Nippon Zeon), Wingtack95 (available from Goodyear Chem), etc., aromatic hydrocarbon resin system such as Nisseki Neo Polymer 120, Nisseki Neo Polymer 160, Nisseki Neo Polymer T, aliphatic hydrocarbon resin system such as Escorez 1202U (available from Exxon Chemical), Escorez 1271 (available from Exxon Chemical), Taclkirol 1000, (available from Sumitomo Chemical), Tack-irol 5000 (available from Sumitomo Chemical), Piccopale (available from Hercules), etc., aliphatic cyclic hydrocarbon resin system such as ARCON P-90 (available from Arakawa Kagaku), ARCON P-100 (available from Arakawa Kagaku), HI-LETZ G-100X (available from Mitsui Petrochemical Industries), etc., Aliphatic alicyclic hydrocarbon based petroleum resin system such as Escorez 1401 (available from Exxon Chemical), aliphatic aromatic petroleum resin system such as Escorez 2101 (available from Exxon Chemical), Escorez 2203 (available from Exxon Chemical), unsaturated hydrocarbon polymer system such as Escorez 8030 (available from Exxon Chemical), etc., hydrogen added hydrocarbon resin system such as Escorez 5380 (available from Exxon Chemical), Escorez 5300 (available from Exxon Chemical), etc., Hydrocarbon-based sticky resin system such as YS resin 7 (available from Yasuhara Chemical), Piccotac resins A (available from Hercules), etc., petroleum based hydrocarbon resin system such as polybutane, atactic polypropylene, liquid-form polybutadiene, cis-1,4-polyisoprene rubber, hydrogen-added polyisoprene rubber, Claprene LIR-290 (available from Kuraray), etc., rosin derivatives system such as pentaerythritol ester of rosin, glycerol ester of rosin, rosin hydride, methyl ester of highly sophisticated rosin, methyl ester of rosin hydride, triethylene glycol ester of rosin hydride, pentaerythritol ester of rosin hydride, hydrogen-added rosin ester, high-melting point ester system resin, polymerizer rosin, resin acid zinc, hardened rosin, etc., turpentine based tackfier, copolycondensed products of synthetic resin and phthalate, nononic activator, etc., and of these compounds. These compounds can be used singly or two or more kinds oft them can be used in combination.

Examples of lubricant and slipping agent include paraffin wax system such as fluidized paraffin, natural paraffin, microwax, polyethylene wax, chlorinated paraffin, fluorocarbon, synthetic paraffin, etc., fatty acid system such as stearic acid, palmitic acid, myristic acid, behenic acid, arachidic, etc., aliphatic amide system such as aliphatic amide, alkylene bis aliphatic amide, etc., fatty acid lower alcohol such as butyl stearate, etc., ester system such as polyhydric alcohol, polyglycol ester, higher alcohol esters, etc., metallic soap such as magnesium stearate, calcium stearate, lono zinc, etc., polyhydric alcohol system such as fatty alcohol, ethylene glycol, diethylene glycol, triethylene glycol, etc., partial ester of fatty acid and polyhydric alcohol, partial ester of fatty acid and polyglycol-polyglycerol, etc. These compounds can be used singly or two or more kinds oft them can be used in combination.

Examples of internal mold release agent include perfluoroalkylbetaine, perfluoroalkylethyleneoxide adduct, ether type phosphate, synthetic organic acid ester derivative, nonion-based activator, etc., and of these compounds, one kind or two or more kinds are allowed to be used.

Examples of defogging agent (drip preventor, fog dip preventor) include sorbitan fatty acid ester system such as Mark 39 (available from Adeka Argus Chemical), Leodol SP-P10 (available from Kao), Leodol SP-O10 (available from Kao), AD-339 (available from Sakai Kagaku), Rheostat SS-60 (available from Lion), Remarkel-P-300 (available from Riken Vitamin), Remarkel S-300 (available from Riken Vitamin), Remarkel O-250 (available from Riken Vitamin), etc., Resistat AF101 (available from Dai-ichi Kogyo Seiyaku), Resistat 8200 (available from Dai-ichi Kogyo Seiyaku), Antox DFM (available from Nihon Nyukazai), PA-1743 (available from Marubishi Yuka), PA-5221 (available from Marubishi Yuka), Denon 4190 (available from Marubishi Yuka), Rheostat DGS (B) (Available from Lion), Remarkel S-105 (available from Riekn Vitamin), Remarkel S-120 (available from Riken Vitamin), Polyethylene glycol monoolate, polyethylene glycol monolaulate, etc. These compounds can be used singly or two or more kinds oft them can be used in combination.

Examples of reodorant used in the present invention for providing a master-batch include peroxides such as Alamaslk AF (available from Launne Poulan), Alamask AO (available from Launne Poulan), Alamask CY (available from Launne Poulan), Alamask H (available from Launne Poulan), Alamask ND (available from Launne Poulan), Rodo No. 0 (available from Bander Built), Rodo Nio. 4 (available from Bander Built), Rodo No. 10 (available from Bander Built), sodium boro hydride, lithium boro hydride, phthalic anhydride, sodium perborate, etc., vanilla essence, etc. These compounds can be used singly or two or more kinds oft them can be used in combination.

Examples of surfactant used in the present invention for providing a master-batch include anionic surfactants, such as carboxylate, hypoborate, cyclic hypoborate, special polycarboxylate type activator, sulfonate, alkyl or alkenyl sulfonate, alkyl allyl sulfornate, polycondensed products of alkyl allyl sulfonate, sulfate, alkyl sulfate, polyoxy ethylene-alkyl ether sulfate, polyoxy ethylene-alkyl phenyl ether sulfate, phosphate, alkyl phosphate, polyoxyethylene-alkyl (phenyl) ether phosphate salt, inorganic phosphate, etc., nonionic surfactanits, such as polyoxyethylene derivatives, polyoxyethylene-alkyl ether, polyoxyethylene-alkyl phenyl ether, polyoxyethylene-polyoxypropylene block polymer, polyoxyethylerne alkyl amine, polyoxyethyleue alkyl amide, polyhydric alcohol based derivatives, etc., cationic surfactant such as alkylamine salt, quaternary ammonium salt, etc., amphoteric surfactants, such as alkylbetaine, etc., fluorine-based surfactant, silicon based surfactant, reactive suractant, etc. These compounds can be used singly or two or more kinds oft them can be used in combination.

Examples of wetting agent used in the present invention for providing a master-batch include alkyl naphthalene sulphonate, alkyl sulphone succinate, sulfate, polyoxyethylene derivatives such as Adekatol NP-675 (available from Asahi Denka), Hionic DE Series (available from San Nopco), Nopco 2272-R-SN (available from San Nopco), Nopco Wet 50 (available from San Nopco), Nopco Wet 50 (available from San Nopco), etc. These compounds can be used singly or two or more kinds oft them can be used in combination.

Examples of antiseptics and fungicides used in the present invention for providing a master-batch include organic chlorine compound system such as pentachlorophenol, p-chlorom-xylenol, dehydro-obi-ethylamine pentachlorophenol (available from Hercules), 4-chloro-2-phenylphenol, N-(trichloromethylthio)phthalimide, N-dimethyl-N'-phenyl-(N'-fluorodichloromethylthio)sulfamide, N-(trichloromethylthio)-4-chlorohexane-1,2-dicarboxyimide, 2,4,5,6-tetrachloro-iso-phthalonitril, etc., organic copper compounds such as copper-8-quinolinolato, etc., organic tin compound system such as bis(tri-n-butyl tin) oxide, tributyl tin laulate, tributyl tin chloride, etc., organic cyanide compound system such as 10,10'-oxybisphenoxazine (available from Bentron), Vinyzene SB-1 (available from Morton Tiokol), Vinyzene SB-5-2 (available from Morton Thiokol), etc., quaternary ammonium carboxylate (available from Rohm & Haas), 2-(4-thiazolyl) benzimidazole, etc. These compounds can be used singly or two or more kinds oft them can be used in combination.

Examples of fillers used in the present invention for providing a master-batch include alumina, antimony trioxide, asbestos, barite, calcium carbonate, gypsum anhydride, kaolin clay, carbon black, diatomaceous earth, feldspar powder, acid clay, quartz, graphite, magnesium carbonate, magnesium hydroxide, magnesium oxide, mica, molybdenum disulfate, agalmatolite clay, sericite, fine silicate, silicide, slate powder, talc, titanium oxide, vermiculite, volcanic ash, whiting, precipitated calcium carbonate, ground calcium carbonate, hydrate silicate, silicic acid anhydride, hydrate silicate, kaolin clay, hard clay, sintered clay, fine talc, etc. These compounds can be used singly or two or more kinds oft them can be used in combination.

Examples of reinforcement used in the present invention for providing a master-batch include glass thread, roving, chopped strand, chopped strand mat, glass cloth, glass tape, roving cloth, milled fiber, etc. These compounds can be used singly or two or more kinds oft them can be used in combination.

In addition, in the present invention for providing a master-batch, as an additive, so-called water-prohibiting material can be used. The water-prohibiting material is the material that loses properties as additives which the material originally possessed by reacting with water or coming into contact with water. The strand after melt-extrusion is generally cooled by allowing it to pass the water tank, but by this method, it was impossible to manufacture the master-batch containing water-prohibiting material. However, using the water-prohibiting material primarily for the core layer and thermoplastic resin that is inactive for water for the sheath layer in conformity to the present invention enables the manufacture of the masterbatch containing the water-prohibiting material by the above-mentioned method. Examples of the said water-prohibiting material include adsorbent, oxygen generating agent, carbon dioxide generating agent, ethylalcohol generating agent, sulfurous acid gas generating agent, or oxygen adsorbent, etc. Examples of adsorbent include silica gel, aluminum oxide, synthetic zeolite represented by molecular sieves, natural zeolite such as mordenite, erionite, etc., clay minerals such as pearlite, acid clay, activated clay, etc., porous glass, magnesium silicate, aluminum silicate, polymer adsorbent, activated coal, activated carbon fiber, molecular sieving carbon, bone carbon, calcium oxide, calcium silicate, calcium chloride, calcium bromide, barium oxide, barium bromide, barium perchlorate, aluminum sulfate, magnesium chloride, magnesium oxide, magnesium sulfate, magnesium perchloride, aluminum sulfate, sodium sulfate, sodium hydroxide, sodium carbonate, potassium carbonate, potassium hydroxide, zinc chloride, zinc bromide, lithium perchlorate. Examples of oxygen generating agent include sodium carbonate hydrogen peroxide adduct system, calcium peroxide system, magnesium peroxide system, etc. Examples of carbon dioxide generating agent include carbonate-organic acid system, carbonate-amino acid system, carbonate-inorganic acid based carbon generating agent, etc. For the ethyl alcohol generating agent, there is, for example, an ethyl alcohol generating agent which is embedded with a water-soluble component. For the sulfurous acid gas, there are, for example, sodium hydrogensulfite system or sodium pyrosulfite system. Furthermore, for the oxygen adsorbent, there are metallic based oxygen adsorbent such as iron powder, etc. and ascorbic acid based oxygen adsorbent. For the thermoplastic resin that is used for the sheath and inactive to water, polyolefin resins such as polypropylene, polyethylene, etc, are preferable of the thermoplastic resins illustrated above.

Since of these additives, it was difficult to use a large volume of UV adsorbent, antistatic agent, light stabilizer, slipping agent, lubricant, etc., which provide particularly low compatibility to resin, and inorganic system flame retardant, filler, antiseptics, etc. for their brittleness by the conventional technique, it is extremely effective to produce a strand form of a core-sheath structure in conformity to the present invention for providing a master-batch.

The masterbatch resin pellets of the present invention are formed into molding by adding and compounding them into the desired natural resin. Examples of process for forming molding include injection molding, extrusion forming, blowing, vacuum, inflation, calendar, slash, dip, foam molding, etc.

Now, the present invention for providing a master-batch is specifically described with specific examples, but the present invention for providing a master-batch is not limited to these examples.

EXAMPLE 4

27.8 parts by weight of powder-form HI-PS resin (MI=5; specific gravity=1.05) and 72.2 parts by weight of red iron oxide (mean particle size: 0.3 $\mu$m; oil adsorbing rate: 24 g/100 g) were mixed in advance with a 75L-mixer, and fed into a three flighted twin extruder (46 $\phi$mm; L/D=30) from which material for core is fed. The pellet form HI-PS resin of the same kind were supplied to a single-screw extruder (30 $\phi$mm; L/D=22), from which material for sheath is fed. The materials were fed from relevant extruders to core-sheath type dies (4 mouth rings) of the present invention at 210° C., the extruded 4 strands are allowed to pass to cool, then, cut by a pelletizer to obtain masterbatch 3 $\phi$mm in diameter and with sheath thickness 0.15 mm. The core-sheath ratio of the masterbatch was core/sheath=9/1 weight ratio), and the pigment concentration in the masterbatch was 65% (weight ratio). In this event, no strand breakage during extrusion nor chip generation at the time of cutting occurred and masterbatch resin pellets with uniform profile and high concentration of pigment were able to be obtained.

COMPARATIVE EXAMPLE 1

35 parts by weight of powder-form HI-PS resin same as that of Example 4 and 65 parts by weight of red iron oxide were mixed with a 75-L mixer and supplied to the three flighted twin-screw extruder (46 $\phi$mm; L/D=30), and fed only to the core section of the core-sheath type dies of the present invention at 210° C. The extruded strand provided low strength, frequently generated strand breakage, and was unable to be produced on the commercial basis.

EXAMPLE 5

55.6 parts by weight of powder-form polyester resin (homo-PET; IV=0.75) and 44.4 parts by weight of carbon black (mean particle size: 25 $\mu$m; DBP oil adsorbing rate: 70 cc/100 g) were mixed in advance with a 75L-mixer, and fed into a three flighted twin extruder (46 $\phi$mm; L/D=30) from which material for core is fed. The pellet form polyester resin of the same kind were supplied to a single-screw extruder (30 $\phi$mm; L/D=22), from which material for sheath is fed The materials were fed from relevant extruders to core-sheath type dies (4 mouth rings) of the present invention at 280° C., the extruded 4 strands are allowed to pass to cool, then, cut by a pelletizer to obtain masterbatch 3 $\phi$mm in diameter and with sheath thickness 0.1 mm. The core-sheath ratio of the masterbatch was core/sheath=9/1 (weight ratio), and the pigment concentration in the masterbatch was 40% (weight ratio). In this event, no strand breakage during extrusion nor chip generation at the time of cutting occurred and masterbatch resin pellets with uniform profile and high concentration of pigment were able to be obtained.

COMPARATIVE EXAMPLE 2

60 parts by weight of powder-form polyester resin same as that of Example 5 and 40 parts by weight of carbon black were mixed with a 75-L mixer and supplied to the three flighted twin-screw extruder (46 $\phi$mm, L/D=30), and fed only to the core section of the core-sheath type dies of the present invention at 280° C. The extruded strand provided low strength, frequently generated strand breakage, and was unable to be produced on the commercial basis.

EXAMPLE 6

85 parts by weight of powder-form nylon-6 resin and 15 parts by weight of lubricant (amide ethylene-bisstearate) were fed, with a weight-type feeder, into a two flighted twin extruder (35 $\phi$mm; L/D=32) from which material for core is fed. The pellet form nylon-6 resin of the same kind were supplied to a single-screw extruder (30 φmm; L/D=22), from which material for sheath is fed The materials were fed from relevant extruders to core-sheath type dies (4 mouth rings) of the present invention at 220° C., the extruded 4 strands are allowed to pass to cool, then, cut by a pelletizer to obtain masterbatch 3 φmm in diameter and with sheath thickness 0.15 mm. The core-sheath ratio of the masterbatch was core/sheath=8/2 (weight ratio), and the lubricant concentration in the masterbatch was 12% (weight ratio). In this event, no strand breakage during extrusion nor chip generation at the time of cutting occurred and masterbatch resin pellets with uniform profile and high concentration of lubricant were able to be obtained.

COMPARATIVE EXAMPLE 3

88 parts by weight of powder-form nylon-6 resin same as that of Example 6 and 12 parts by weight of the lubricant were fed, with a weight-type feeder, into a two flighted twin extruder (35 φmm; L/D=32). The materials were fed from the extruders only to the core section of the core-sheath type dies of the present invention at 220° C. The extruded strand provided low strength, frequently generated strand breakage, and was unable to be produced on the commercial basis.

EXAMPLE 7

17 parts by weight of pellet-form polypropylene resin (homo-PP; MI=8), 40 parts by weight of a master powder which is previously prepared by kneading a low molecular weight polyethylene resin and quinacridone red with open rolls, etc., the weight ratio of the polyethylene resin and the pigment being 60:40, and 43 parts by weight of a master powder, which is previously prepared by kneading a low molecular weight polyethylene resin and isoindolinone, the weight ratio of the polyethylene resin and the pigment being 50:50, were mixed with a tumbler and fed into a two flighted twin extruder (35 φmm; L/D=32) from which material for core is fed. The pellet form polypropylene resin (homo-PP) of the same kind were supplied to a single-screw extruder (30 φmm; L/D=22), from which material for sheath is fed. The materials were fed from relevant extruders to core-sheath type dies (4 mouth rings) of the present invention at 180° C., the extruded 4 strands are allowed to pass to cool, then, cut by a pelletizer to obtain masterbatch 3 φmm in diameter and with sheath thickness 0.2 mm. The core-sheath ratio of the masterbatch was core/sheath=8/2 (weight ratio), and the pigment concentration in the masterbatch was 30% (weight ratio). In this event, no strand breakage during extrusion nor chip generation at the time of cuttings occurred and masterbatch resin pellets with uniform profile and high concentration of lubricant were able to be obtained.

COMPARATIVE EXAMPLE 4

33.6 parts by weight of pellet form polypropylene resin (homo-PP) same as that of Example 7, 32 parts by weight of a master powder which is previously prepared by kneading a low molecular weight polyethylene resin and quinacridone red with open rolls, etc., the weight ratio of the polyethylene resin and the pigment being 60:40, and 34.4 parts by weight of a master powder, which is previously prepared by kneading a low molecular weight polyethylene resin and isoindolinone, the weight ratio of the polyethylene resin and the pigment being 50:50, were mixed with a tumbler and fed into a two flighted twin extruder (35 φmm; L/D=32). The materials were fed from the extruders only to the core section of the core-sheath type dies of the present invention at 180° C. The extruded strand caused so-called surging effect and did not have a uniform thickness. As the result, a master-batch having uniform profile was not obtained. Further, the extruded strand provided low strength, frequently generated strand breakage and chip at the time of cutting, and was unable to be produced on the commercial basis.

EXAMPLE 8

81.25 parts by weight of low density polyethylene resin (MI=4 g/cc, density: 0.92 g/cm$^3$) and 18.75 parts by weight of an amine type antistatic agent were fed into a two flighted twin extruder at 160° C. from which material for core is fed. The low density polyethylene resin of the same kind were supplied to a single-screw extruder at 160° C. from which material for sheath is fed The materials were fed from relevant extruders to core-sheath type dies of the present invention at 160° C., the extruded strands are allowed to pass to cool, then, cut by a pelletizer to obtain masterbatch 3 φmm in diameter and with sheath thickness 0.16 mm. The core-sheath ratio of the masterbatch was core/sheath=8/2 (weight ratio), and the additive (antistatic agent) concentration in the masterbatch was 15% (weight ratio). Checking the die and the cool tank, no bleeding of the additive was observed. The pellets were produced in a good environment.

COMPARATIVE EXAMPLE 5

During conducting the same procedure as in Example 5, immediate after the supply for the sheath from the single-screw extruder was stopped, smoke emitted from the die and contamination in the cool tank occurred. The strand became unstable, breakage of the strand occurred and stable production of master-batch was not able to be conducted.

By lowering the additive concentration in the masterbatch to 10% (weight ratio), the strand became stable. However, emission of smoke from the die and contamination of cool tank still occurred, that is, very bad production environment.

According to the present invention for providing a master-batch, master-batch resin pellets containing pigments, etc. at a high concentration can be produced without generating strand breakage during extrusion or chip at the time of cutting.

Further the present invention has the following effect.

The master-batch used for producing an anti-fogging film used in the agricultural field or a stretch film contains a tackifier or a surface active agent which may cause bleeding. The additives, that is, the tackifier or the surface active agent, compounded in a resin often bleed from the strand during the manufacturing masterbatch pellets, and the bled additives deteriorate the environment for producing the master-batch. For example, they cause emission of smoke from the die and contamination in the cool tank. Therefore, a facility for removing the bled additives is required. However, using master-batch pellets according to the present invention, the above-mentioned problems can be solved because the resin containing the additives are covered with the sheath and, therefore, emission of smoke from the di, contamination in the cool tank and the like are prevented.

As mentioned above, the present invention further provides a process for drying thermoplastic polyester resin. The invention providing a process for drying thermoplastic polyester resin is characterized by that the thermoplastic polyester resin is dried in the form of multilayer thermoplastic resin pellets having a core-sheath structure with a the thermoplastic polyester resin used as a core and another thermoplastic resin that does not cause blocking at drying temperature at which the thermoplastic polyester resin to be dried causes blocking used as a sheath. Due to the characteristics, high drying temperature can be employed and the drying is accelerated. The multilayer thermoplastic polyester resin pellets is manufactured by simultaneously extruding the core thermoplastic polyester resin and the sheath thermoplastic resin in the molten state from core-sheath type dies, followed by pelletization.

In the present invention providing a process for drying thermoplastic polyester resin, the thermoplastic polyester resin to be dried, i.e. to be used as a core, may compound various additives, pigments, etc. as required. That is, the thermoplastic polyester resin to be dried may be a simple substance of the resin or a composition including the resin.

The said thermoplastic polyester resin is a polymer having ester bond, such as ester unit with dicarboxylic acid component and glycol component condensed, or ester unit with dicarboxylic acid component, glycol component, and hydroxycarboxylic acid component condensed, etc. Examples of dicarboxylic acid include aromatic dicarboxylic acid such as terephthalic acid, isophthalic acid, phthalic acid, 2,6-naphthalenecarboxylic acid, 4,4'-diphenyldicarboxylic acid, etc., or aliphatic dicarboxylic acid such as adipic acid, sebacic acid, etc. Examples of glycol includes ethylene glycol, propylene glycol, diethylene glycol, triethylene glycol, 1,3-propanediol, 1,4-cyclohexene dimethanol, etc., and examples of hydroxycarboxylic acid include p-hydroxybenzoic acid, etc., and various additives may be contained.

The thermoplastic polyester resin which serves as a core is the thermoplastic polyester resin with low softening point, melting point, or glass transition temperature, in particular, those containing noncrystal polyester resin; low-melting point polyester resin, or the like.

The noncrystal polyester resin is the polyester resin which does not form crystals by gradually cooling from the melting state. The absence of crystal formation is able to be confirmed by observing nothing else noncrystal hollows by wide angle X-ray diffraction measurement. The crystalline polyester resin is the polyester resin which forms crystal by slowly cooling from the molten state. The crystal referred to here is that which generates diffraction with a peak area equal to or greater than the peak area of noncryetal hollow when wide-angle X-ray diffraction is measured. Specifically, the most typical example is glycol-modified PET obtained by copolymerizing terephthalic acid, ethylene-lycol, and 1,4-cyclohexanedimethanol (EASTAR6763, GN071 commercially available from Eastman Chemical Co., Ltd.), and other examples include VYLON 200, 103, 300, 500 commercially available from Toyobo Co., Ltd., ELITEL UE3220, UE3221, TUE3230, UE3231, UE3400, UE3500 commercially available from Unitika Ltd., CHEMIT R-50, R-188, R-80, R-70, K-1294, K-1089 commercially available from Toray Industries, Inc., etc.

Specifically, examples of the low-melting-point polyester resin include VYLON 30P (melting point: 125° C.), GM-900 (melting point: 113° C.), GM-400 (melting point: 143° C.) of Toyobo, CHEMIT R-1450 (melting point: 191° C.), Q-1500 (melting point: 170° C.), R-251 (melting point: 130° C.), R-282 (melting point: 113° C.), R-99 (melting point: 75° C.), etc. of Toray.

The softening point referred to in the present invention is the temperature at which deformation initiates when the substance is heated at a specified rate. When noncrystal substance is heated, it gradually softens without indicating a definite melting point like the crystalline substance and achieves the molten state. The measurement method generally adopted is JISK-2531. In general, drying thermoplastic polyester resin at temperature higher than this softening point melts pellets, causes them to stick to one another, and prevents them from being fed to the hopper at the time of molding. If the resin is noncrystal, the -lass transition temperature is important as well as the softening point, and the similar problem results when the resin is dried at the temperature higher than this glass transition point. For crystalline substance, the melting point is generally used rather than the softening point. The melting point is generally measured by a differential thermal analysis apparatus, and is handled in the same manner as the softening point in the case of noncrystal substance.

The thermoplastic resin to be used as the sheath in the present invention providing a process for drying thermoplastic polyester resin may be any thermoplastic resin, if it does not cause blocking at the drying temperature at which blocking said core, and "noncrystal" or "crystalline" is not particularly limited. Specifically, it may be a thermoplastic polyester resin or polyamide, polycarbonate, polyether sulphone, polysulphone, polyarylate, polyimide, etc. In this event, if as uniform a quality as possible is required for the final product, it is desirable that the same kind of resin should be used for both core and sheath, and therefore, thermoplastic polyester resin should be preferably used also for the sheath, and it is further preferable to be the crystalline resin.

It refers to the following condition to say that blocking occurs or does not occur in the thermoplastic polyester resin related to the present invention. That is, it is the condition free of blocking that no pellets stick one another when 100 of thermoplastic polyester resin pellets are placed in a beaker in such a manner that pellets lie one on top of another and the bealker is placed in a thermostat set to a specified temperature and removed after it is let to stand for 2 hours.

By the way, it can be easily judged by the following method without undergoing the above test. That is, (1) when the core thermoplastic polyester resin is crystalline and the sheath thermoplastic resin is also crystalline, if the sheath melting point is higher than the core melting point, it is the condition in which no blocking occurs, (2) when the core thermoplastic polyester resin is crystalline and the sheath thermoplastic resin is noncrystal, if the sheath glass transition temperature is higher than the core melting point, it is the condition in which no blocking occurs, (3) when the core thermoplastic polyester resin is noncrystal and the sheath thermoplastic resin is crystalline, if the sheath melting point is higher than the core softening point or glass transition temperature, it is the condition no blocking occurs, and (4) when the core thermoplastic polyester resin is noncrystal and the sheath thermoplastic resin is noncrystal, if the sheath glass transition temperature is higher than the core softening point or glass transition temperature, it is the condition that no blocking occurs.

In the present invention providing a process for drying thermoplastic polyester resin, the ratio of the core to the sheath is not particularly limited, but the content of the core thermoplastic polyester resin is preferably greater than that of sheath thermoplastic resin, and the weight ratio of core to sheath is preferably between 50/50 and 99/1, and more suitably between 93/7 and 99/1. When the sheath ratio is greater than the said range, there is a fear of impairing the core characteristics when pellets are used, which is not desirable. If the sheath ratio is excessively smaller than the said range, the effects of the present invention by the support of the sheath are unable to be successfully displayed, which is not desirable.

The pellet profile of the core-sheath structure according to the present invention is not particularly limited, but because the smaller the pellet cross section not covered with the sheath, the less likely is for the pellets to adhere to one another during drying, the pellet diameter is preferably between 0.5 and 5 mm$\phi$ in terms of "circle," and more suitably between 1 and 3 mm$\phi$. The pellet length is not particularly limited, either, but because the greater the area of the part covered with the sheath, the less likely is for pellets to adhere to one another during drying, the pellet length is preferably between 1 and 5 mm, and more suitably between 3 and 5 mm.

The thermoplastic polyester resin used for the core and/or the thermoplastic resin used for the sheath may contain pigments and additives, and may be the blend used for so-called masterbatch.

The masterbatch prepared by the process for drying thermoplastic polyester resin of the present invention may be the same masterbatch of the above mentioned invention providing a masterbatch. The preferable diluting ratio by natural resin, preferable pigments and additives to be compounded in the masterbatch are the same as those exemplified above.

The drying method of the thermoplastic polyester resin according to the present invention providing a process for drying thermoplastic polyester resin is characterized by drying in the form of pellets of core-sheath structure having the above-mentioned configuration. By the configuration according to the present invention, mutual sticking of pellets and blocking can be prevented by the presence of support by sheath thermoplastic resin even when the core thermoplastic polyester resin is dried at high temperature that causes blocking and the said core thermoplastic polyester resin becomes a kind of fluidized condition.

The drying temperature in the said drying method is the temperature higher than that at which the core thermoplastic polyester resin causes blocking, but it must be lower than the temperature at which the sheath thermoplastic resin causes blocking.

For a dryer that can be used for the present invention, those generally used for drying thermoplastic polyester resin can be used, and they are not particularly limited. Specifically, examples include a material ventilation dryer, batch-type box dryer, material transfer type dryer, material agitating type dryer, hot air transfer type dryer, cylindrical dryer, infrared dryer, high-frequency dryer, etc.

Examples of drying method of these dryers include the hot air drying method, radiation dry method, indirect drying method, uniform heat generation method, vacuum drying method, heating steam drying method, etc., and there is no particular limitation.

For the process for manufacturing core-sheath structure polyester resin pellets of the present invention, using two extruders, materials are supplied in the molten condition to the core side and the sheath side, respectively, extruded into a strand form by the core-sheath type dies, cooled in a water tank, and cut into pellets form by a pelletizer to obtain thermoplastic polyester resin pellets of the core-sheath structure according to the present invention.

According to the above manufacturing method, if the core thermoplastic polyester resin itself is difficult to be pelletized, specifically, for example, if the core thermoplastic polyester resin contains VYLON GV110 (molecular weight: 2000 to 3000; softening point: 92° C.), GV200 (molecular weight: 3000 to 4000; softening point: 95° C.), GV700 (molecular weight: 2500 to 3500; softening point: 86° C.), GV730 (molecular weight: 3000 to 4000; softening point: 94° C.), GV740 (molecular weight: 3000 to 4000; softening point: 94° C.)available from Toyobo, ELIETEL UE3320 (molecular weight: 1800; softening point: 63° C.), UE3360 (molecular weight: 5000; softening point: 80° C.), UE3380 (molecular weight: 8000; softening point: 72° C.), etc. available from Unitika, whose molecular weight is 10000 or less, the sheath thermoplastic resin is extruded simultaneously from the core-sheath type dies to form a core-sheath structure, and it is therefore easy to produce the pellet form. Consequently, for the thermoplastic polyester resin which were difficult to be pelletized and be dried, the drying method according to the present invention is extremely effective.

Now, the present invention providing a process for drying thermoplastic polyester resin is specifically described with examples, but the present invention is not limited to these examples.

EXAMPLE 9

Noncrystal polyester resin A with softening point of about 80° C. (trade name: Eastman Chemical's EASTAR6763; density: 1.27 g/cm$^3$; IV=0.75) was supplied to the twin-screw extruder for core (46 $\phi$mm, L/D=35). Copolymer polyester resin B with higher softening point than A (trade name: Nippon Ester's UNIPET RN163; melting-point 235° C.; density: 1.41 g/cm$^3$; IV=0.84) was supplied to the single-screw extruder for sheath (50 $\phi$mm, L/D=25). From the relevant extruders, core material and sheath material were supplied to core-sheath type dies (6 mouthpieces) of the present invention at 250° C. at a core-to-sheath ratio of 80/20 wt %. The six strands extruded were allowed to pass the water tank to cool, and cut by a pelletizer. Pellets with core-sheath structure 3.0 mm in outside diameter, 3.0 mm long, and 0.14 mm in sheath thickness were obtained.

EXAMPLE 10

According to the same manner as in Example 9, pellets with a core-sheath structure at core/sheath=90/10 wt %, 3.0 mm in outside diameter, 3.0 mm long, and 0.07 mm in sheath thickness were obtained.

The pellets obtained in Examples 9 and 10 were evaluated. Table 2 shows the results. The evaluation methods are shown as follows.

Moisture content: About 0.5 g of pellet was measured by the Karl Fischer's moisture meter (trace moisture measuring apparatus CA-06 manufactured by Mitsubishi Chemical) at 300° C. of measuring temperature and 200 mL/min of N$_2$ gas flow rate.

Drying test: About 100 g of each pellet were placed in aluminum cups and after letting them stand for a specified time in gear ovens adjusted to each temperature, the blocking property of pellets was observed and the moisture content of pellet after drying was measured.

COMPARATIVE EXAMPLE 6

According to the same manner as in Examples 9 and 10, noncrystal polyester resin A was supplied to the twin-screw extruder as-non-processed, extrtuded as it was without any sheath attached, and cut to obtain pellets. Evaluation was carried out in the similar manner as in the case of Examples 9 and 10. Table 2 shows the results.

TABLE 2

|  | Core-to-sheath ratio (wt %) | Undried Moisture content (%) | After drying at 150° C. for 2 hours | | After drying at 60° C. for 18 hours | |
| --- | --- | --- | --- | --- | --- | --- |
|  |  |  | Moisture content (%) | Blocking | Moisture content (%) | Blocking |
| Example 9 | A/B = 80/20 | 0.48 | 0.02 or less | No | 0.20 | No |
| Example 10 | A/B = 90/10 | 0.50 | 0.02 or less | No | 0.21 | No |
| Comparative Example 6 | No sheath | 0.45 | — | Generated | 0.20 | No |

EXAMPLE 11

Noncrystal polyester resin C with softening point of about 63° C. (trade name: UNITIKAl's Elitel UE3203; density: 1.26 g/cm³; Grass Transition Temperature 40° C.) was supplied to the twin-screw extruder for core (46 φmm, L/D=35). Copolymer polyester resin D with higher softening point than C (trade name: UNITIKAl's Elitel UE3690; density: 1.25 g/cm³, Grass Transition Temperature 90° C., Softening point 160° C.) was supplied to the single-screw extruder for sheath (50 φmm, L/D=25). From the relevant extruders, core material and sheath material were supplied to core-sheath type dies (6 mouthpieces) of the present invention at 180° C. at a core-to-sheath ratio of 50/50 wt %. The six strands extruded were allowed to pass the water tank to cool, and cut by a pelletizer. Pellets with core-sheath structure 3.0 mm in outside diameter, 3.0 mm long, and 0.44 mm in sheath thickness were obtained.

EXAMPLE 12

According to the same manner as in Example 11, pellets with a core-sheath structure at core/sheath=80/20 wt %, 3.0 mm in outside diameter, 3.0 mm long, and 0.16 mm in sheath thickness were obtained.

Moisture content measurement and Drying test were conducted about the pellets obtained in Examples 11 and 12, according to the same manner as in Examples 11 and 12. he results are shown in Table 3.

COMPARATIVE EXAMPLE 7

According to the same manner as in Examples 11 and 12, noncrystal polyester resin C was supplied to the twin-screw extruder, extruded as it was without any sheath attached, and cut, but the extruded strand was broken to small pieces and did not form pellets. Evaluation was carried out in the similar manner as in the case of Examples 11 and 12. Table 3 shows the results.

TABLE 3

|  | Core-to-sheath ratio (wt %) | Undried Moisture content (%) | After drying at 80° C. for 4 hours | | After drying at 30° C. for 18 hours | |
| --- | --- | --- | --- | --- | --- | --- |
|  |  |  | Moisture content (%) | Blocking | Moisture content (%) | Blocking |
| Example 11 | C/D = 50/50 | 0.27 | 0.02 or less | No | 0.24 | No |
| Example 12 | C/D = 80/20 | 0.29 | 0.02 or less | No | 0.23 | No |
| Comparative Example 7 | No sheath | 0.30 | — | Generated | 0.23 | No |

EXAMPLE 13

37% by weight of pulverized noncrystal polyester resin A with softening point of about 80° C. (trade name: Eastman Chemical's EASTAR6763; density: 1.27 g/cm³; IV=0.75) and 63% by weight of titanium dioxide were supplied to the twin-screw extruder for core (46 φmm, L/D=35). Copolymer polyester resin B with higher softening point than A (trade name: Nippon Ester's UNIPET RN163; melting point 235° C.; density: 1.41 g/cm³; IV=0.84) was supplied to the single-screw extruder for sheath (50 φmm, L/D=25). From the relevant extruders, core material and sheath material were supplied to core-sheath type dies (6 mouthpieces) of the present invention at 250° C. at a core-to-sheath ratio of 95/5 wt %. The six strands extruded were allowed to pass the water tank to cool, and cut by a pelletizer. Pellets with core-sheath structure 3.0 mm in outside diameter, 3.0 mm long, and 0.06 mm in sheath thickness were obtained.

Moisture content measurement and Drying test were conducted about the pellets obtained in Example 13, according to the same manner as in Examples 9 and 10. The results are shown in Table 4.

COMPARATIVE EXAMPLE 8

According to the same manner as in Example 12, 40% by weight of pulverized noncrystal polyester resin A and 60% by weight of titanium dioxide were supplied to the twin-screw extruder, extruded as it was without any sheath attached, and cut to obtain pellets (master-batch). Evaluation was carried out in the similar manner as in the case of Example 13. Table 4 shows the results.

TABLE 4

|  | Core-to-sheath ratio (wt %) | Undried Moisture content (%) | After drying at 150° C. for 2 hours | | After drying at 60° C. for 18 hours | |
| --- | --- | --- | --- | --- | --- | --- |
|  |  |  | Moisture content (%) | Blocking | Moisture content (%) | Blocking |
| Example 13 | 95/5 | 0.61 | 0.02 or less | No | 0.31 | No |
| Comparative Example 8 | No sheath | 0.62 | — | Generated | 0.33 | No |

EXAMPLE 14

95% by weight of pulverized noncrystal polyester resin A with softening point of about 80° C. (trade name: Eastman Chemical's EASTAR6763; density: 1.27 g/cm³; IV=0.75) and 5%. by weight of ultra violet ray absorber (trade name: Chiba Specialty Chemical's TINUVIN326) were supplied to the twin-screw extruder for core (46 φmm, L/D=35). Copolymer polyester resin with higher softening point than A (trade name: Sumitomo Dow's Caliber 200–4; softening point 140° C.; density: 1.20 g/cm$^3$) was supplied to the single-screw extruder for sheath (50 φmm, L/D=25). From the relevant extruders, core material and sheath material were supplied to core-sheath type dies (6 mouthpieces) of the present invention at 280° C. at a core-to-sheath ratio of 80120 wt %. The six strands extruded were allowed to pass the water tank to cool, and cut by a pelletizer. Pellets with core-sheath structure 3.0 mm in outside diameter, 3.0 mm long, and 0.17 mm in sheath thickness were obtained.

Moisture content measurement (measuring temperature 230° C.) and Drying test were conducted about the pellets obtained in Example 13, according to the same manner as in Examples 9 and 10. The results are shown in Table 5.

COMPARATIVE EXAMPLE 9

According to the same manner as in Example 14, 96% by weight of pulverized noncrystal polyester resin A and 4% by weight of the ultra violet absorber were supplied to the twin-screw extruder, extruded as it was without any sheath attached, and cut to obtain pellets (master-batch). Evaluation was carried out in the similar manner as in the case of Example 14. Table a shows the results.

TABLE 5

| | Core-to-sheath ratio (wt %) | Undried Moisture content (%) | After drying at 120° C. for 3 hours | | After drying at 60° C. for 18 hours | |
|---|---|---|---|---|---|---|
| | | | Moisture content (%) | Blocking | Moisture content (%) | Blocking |
| Example 14 | 80/20 | 0.30 | 0.02 or less | No | 0.12 | No |
| Comparative Example 9 | No sheath | 0.30 | — | Generated | 0.13 | No |

According to the process of the present invention for drying thermoplastic polyester resin, the resin can be dried at a high drying temperature, which causes blocking of the thermoplastic polyester resin to be dried, and the moisture in the resin can be reduced in a short period. As the result, the time for drying thermoplastic polyester resin can be shortened, and cost for drying can be reduced.

What is claimed is:

1. A process for manufacturing multilayer pellets having a core-sheath structure with a molding material forming a sheath which covers around an outer circumference of another molding material forming a core, which comprises:
   (a) providing a die equipment, which comprises:
      a core-material supply port for feeding core material,
      a sheath material supply port for feeding sheath material,
      a plurality of extrusion-forming sections which are arranged at a plurality of places along a circumference and extrudes the core material and the sheath material so that the sheath material concentrically covers around the outer circumference of the core material,
      a core material supply route for supplying the core material from the core material supply port to a center of each extrusion-forming section, which extends first from the core material supply port to a center axis of the circumference on which the plurality of extrusion-forming sections are arranged, and thereafter, extends in a radial direction from the center axis towards each extrusion-forming section, and
      a sheath material supply route for supplying the sheath material from the sheath material supply port to the outer circumference of the core material in each extrusion-forming section, which extends first from the sheath material supply port to the center axis of the circumference on which the plurality of the extrusion-forming sections are arranged, and thereafter, extends in the radial direction from the center axis towards each extrusion-forming section;
   (b) supplying the core material and the sheath material to the core material supply port and the sheath material supply port, respectively;
   (c) extruding a plurality of multilayer strands from the extrusion-forming sections by covering around the outer circumference of the core material concentrically with the sheath material; and
   (d) cutting the extruded multilayer strands to manufacture multilayer pellets.

2. The process for manufacturing multilayer pellets according to claim 1, wherein an outside diameter of the multilayer strand is between 1 and 10 mm.

3. The process for manufacturing multilayer pellets according to claim 1, wherein the extruding is performed using a mono-axial extruder or a twin screw extruder.

4. The process for manufacturing multilayer pellets according to claim 1, wherein the cutting is performed using a rotary knife.

5. The process for manufacturing multilayer pellets according to claim 1, wherein an outside diameter of the multilayer strand is between 3 and 7 mm.

6. A process for manufacturing multilayer pellets having a core-sheath structure with a molding material forming a sheath which covers around an outer circumference of another molding material forming a core, which comprises:
   (a) providing a die equipment, which comprises:
      a core-material supply port for feeding core material,
      a sheath material supply port for feeding sheath material,
      a plurality of extrusion-forming sections which are arranged at a plurality of places along a circumference and extrudes the core material and the sheath material so that the sheath material concentrically covers around the outer circumference of the core material,
      a core material supply route for supplying the core material from the core material supply port to a center of each extrusion-forming section, which extends first from the core material supply port to a center axis of the circumference on which the plurality of extrusion-forming sections are arranged, and thereafter, extends in a radial direction from the center axis towards each extrusion-forming section, and
      a sheath material supply route for supplying the sheath material from the sheath material supply port to the outer circumference of the core material in each extrusion-forming section, which extends first from the sheath material supply port to the center axis of the circumference on which the plurality of the extrusion-forming sections are arranged, and thereafter, extends in the radial direction from the center axis towards each extrusion-forming section;
   (b) supplying the core material and the sheath material to the core material supply port and the sheath material supply port, respectively;

(c) extruding a plurality of multilayer strands from the extrusion-forming sections by covering around the outer circumference of the core material concentrically with the sheath material; and (d) cutting the extruded multilayer strands to manufacture multilayer pellets, wherein the process extrudes a thermoplastic resin and at least one compound (A) selected from pigments or additives into the strands so that 80 wt % or more of the compound (A) is contained in the core.

7. The process for manufacturing multilayer pellets according to claim 6, wherein an outside diameter of the multilayer strand is between 1 and 10 mm.

8. The process for manufacturing multilayer pellets according to claim 6, wherein the thermoplastic resin is at least one resin selected from the group consisting of polystyrene, polypropylene, polyethylene, AS resin, ABS resin, (meth)acrylic resin, vinyl chloride resin, poly(vinylidene chloride), poly(vinyl acetate), polyolefin, polyethylene terephthalate, polybutylene terephthalate, polyacetal, polycarbonate, polyamide, acetylcellulose, fluororesin, polyester resin, aryl resin, silicone resin and thermoplastic elastomer.

9. The process for manufacturing multilayer pellets according to claim 6, wherein the pigment is an organic pigment or an inorganic pigment.

10. The process for manufacturing multilayer pellets according to claim 6, wherein the additives include at least one material selected from the group consisting of a plasticizer, antioxidant, UV absorbent, light stabilizer, flame-resistant agent, antibacterial agent, antistatic agent, copper inhibitor, metal deactivator, tackifier, lubricant, slipping agent, internal mold release agent, defogging agent, deodorant, surfactant, wetting agent, preservative, filler, reinforcing agent, stabilizer, heat insulator, foam agent, damping material, impact resistance improver, surface treating agent and dispersant.

* * * * *